United States Patent
Ellanti et al.

(10) Patent No.: US 9,140,569 B2
(45) Date of Patent: *Sep. 22, 2015

(54) LOCATION BASED SYSTEM WITH CONTEXTUAL CONTACT MANAGER MECHANISM AND METHOD OF OPERATION THEREOF

(75) Inventors: Manohar Ellanti, Fremont, CA (US); HaiPing Jin, San Jose, CA (US); Shawn Timothy Carolan, Los Altos, CA (US)

(73) Assignee: TELENAV, INC, Sunnyvale, CA (US)

( * ) Notice: Subject to any disclaimer, the term of this patent is extended or adjusted under 35 U.S.C. 154(b) by 764 days.

This patent is subject to a terminal disclaimer.

(21) Appl. No.: 12/880,091

(22) Filed: Sep. 11, 2010

(65) Prior Publication Data

US 2011/0066366 A1    Mar. 17, 2011

Related U.S. Application Data

(60) Provisional application No. 61/241,799, filed on Sep. 11, 2009.

(51) Int. Cl.
*G01C 21/00* (2006.01)
*G01C 21/34* (2006.01)
*G06Q 10/10* (2012.01)

(52) U.S. Cl.
CPC ............ *G01C 21/3438* (2013.01); *G06Q 10/10* (2013.01); *G06Q 10/109* (2013.01)

(58) Field of Classification Search
CPC ............... G01C 21/00; G01C 21/3611; G08G 1/096827
USPC .......... 701/32.3, 37, 469; 705/1.1, 26.8, 342; 340/426.19, 539.13, 572.1, 6.1, 936, 340/988; 342/357.3, 357.4, 357.5, 450
See application file for complete search history.

(56) References Cited

U.S. PATENT DOCUMENTS

| | | | |
|---|---|---|---|
| 6,269,369 | B1 | 7/2001 | Robertson |
| 6,618,593 | B1 | 9/2003 | Drutman et al. |
| 6,665,613 | B2 | 12/2003 | Duvall |
| 6,779,021 | B1 | 8/2004 | Bates et al. |
| 6,883,000 | B1 | 4/2005 | Gropper |
| 7,280,822 | B2 | 10/2007 | Fraccaroli |
| 7,327,250 | B2 | 2/2008 | Harvey |
| 7,327,258 | B2 * | 2/2008 | Fast et al. .................... 340/572.1 |
| 7,489,939 | B2 * | 2/2009 | Ashley et al. ............... 455/456.6 |
| 7,493,211 | B2 * | 2/2009 | Breen .......................... 701/32.3 |
| 7,711,779 | B2 | 5/2010 | Goodman et al. |
| 7,848,765 | B2 | 12/2010 | Phillips et al. |
| 8,325,025 | B2 | 12/2012 | Morgan et al. |
| 8,362,887 | B2 | 1/2013 | Morgan et al. |
| 2003/0105826 | A1 | 6/2003 | Mayraz |
| 2004/0176973 | A1 | 9/2004 | Lapeze et al. |

(Continued)

OTHER PUBLICATIONS

U.S. Appl. No. 12/880,093, filed Sep. 11, 2010, Ellanti et al.

(Continued)

*Primary Examiner* — Ian Jen
(74) *Attorney, Agent, or Firm* — IP Investment Law Group

(57) ABSTRACT

A method of operation of a location based system includes: detecting an event; establishing an event context time associated with the event; establishing a geofence associated with the event; and identifying an event participant, associated with the event, with the event participant within the geofence during the event context time for displaying on a device.

20 Claims, 7 Drawing Sheets

(56) References Cited

U.S. PATENT DOCUMENTS

| | | | |
|---|---|---|---|
| 2005/0156715 A1* | 7/2005 | Zou et al. ................ 340/426.19 |
| 2005/0159863 A1* | 7/2005 | Howard et al. ................ 701/37 |
| 2005/0242971 A1* | 11/2005 | Dryer ................ 340/870.11 |
| 2006/0007039 A1* | 1/2006 | Duvall ................ 342/357.08 |
| 2006/0011721 A1* | 1/2006 | Olsen et al. ................ 235/385 |
| 2006/0031464 A1 | 2/2006 | Bowman et al. |
| 2006/0099969 A1* | 5/2006 | Staton et al. ................ 455/456.4 |
| 2006/0099971 A1* | 5/2006 | Staton et al. ................ 455/456.6 |
| 2006/0181411 A1* | 8/2006 | Fast et al. ................ 340/539.13 |
| 2006/0234727 A1* | 10/2006 | Ashley et al. ................ 455/456.4 |
| 2006/0270421 A1* | 11/2006 | Phillips et al. ................ 455/457 |
| 2007/0185728 A1 | 8/2007 | Schwarz et al. |
| 2007/0210936 A1* | 9/2007 | Nicholson ................ 340/988 |
| 2007/0244977 A1 | 10/2007 | Atkins |
| 2007/0296574 A1 | 12/2007 | Smith et al. |
| 2008/0052757 A1* | 2/2008 | Gulati et al. ................ 726/1 |
| 2008/0086323 A1* | 4/2008 | Petrie et al. ................ 705/1 |
| 2008/0086497 A1* | 4/2008 | Wallace et al. ................ 707/102 |
| 2008/0129491 A1* | 6/2008 | Ruperto ................ 340/539.13 |
| 2008/0143604 A1* | 6/2008 | Mock et al. ................ 342/450 |
| 2008/0147812 A1 | 6/2008 | Curtis |
| 2008/0167896 A1* | 7/2008 | Fast et al. ................ 705/1 |
| 2008/0174485 A1* | 7/2008 | Carani et al. ................ 342/357.07 |
| 2008/0183485 A1* | 7/2008 | Drabble et al. ................ 705/1 |
| 2008/0238769 A1* | 10/2008 | Verechtchiagine ................ 342/357.12 |
| 2008/0252487 A1* | 10/2008 | McClellan et al. ................ 340/936 |
| 2008/0268869 A1* | 10/2008 | Lamba et al. ................ 455/456.1 |
| 2008/0281518 A1* | 11/2008 | Dozier et al. ................ 701/213 |
| 2008/0305779 A1* | 12/2008 | Wright et al. ................ 455/414.1 |
| 2008/0305808 A1* | 12/2008 | Chan et al. ................ 455/456.1 |
| 2009/0009357 A1* | 1/2009 | Heen et al. ................ 340/825.49 |
| 2009/0017811 A1 | 1/2009 | Cole et al. |
| 2009/0018929 A1* | 1/2009 | Weathers, Jr. ................ 705/27 |
| 2009/0037546 A1 | 2/2009 | Kirsch |
| 2009/0082139 A1* | 3/2009 | Hart ................ 473/407 |
| 2009/0093958 A1* | 4/2009 | Wang et al. ................ 701/214 |
| 2009/0131080 A1 | 5/2009 | Nadler et al. |
| 2009/0138336 A1 | 5/2009 | Ashley, Jr. et al. |
| 2009/0140886 A1* | 6/2009 | Bender ................ 340/988 |
| 2010/0070758 A1 | 3/2010 | Low et al. |
| 2010/0148947 A1 | 6/2010 | Morgan et al. |
| 2010/0262449 A1 | 10/2010 | Monteforte et al. |
| 2011/0060796 A1 | 3/2011 | Grigsby et al. |
| 2011/0066690 A1 | 3/2011 | Ellanti et al. |
| 2011/0070872 A1 | 3/2011 | Ellanti et al. |
| 2013/0029696 A1* | 1/2013 | Ellanti et al. ................ 455/457 |

OTHER PUBLICATIONS

U.S. Appl. No. 12/880,096, filed Sep. 11, 2010, Ellanti et al.

International Search Report for Application No. PCT/US2010/048551 dated Nov. 1, 2010.

Lunford et l al., "Because I Carry My Cell Phone Anyway: Functional Location-Based Reminder Applications", CHI 2006 Proceedings, Everyday Use of Mobiles, Apr. 22-27, 2006, pp. 889-898.

Karimi, H. A. et al. "SoNAvNet: A Framework for Social Navigation Networks", Geoinformatics Laboratory, University of Pittsburgh, 2009, pp. 81-87.

* cited by examiner

LOCATION BASED SYSTEM WITH CONTEXTUAL CONTACT MANAGER MECHANISM AND METHOD OF OPERATION THEREOF

CROSS-REFERENCE TO RELATED APPLICATION

This application claims the benefit of U.S. Provisional Patent Application Ser. No. 61/241,799 filed Sep. 11, 2009, and the subject matter thereof is incorporated herein by reference thereto.

TECHNICAL FIELD

The present invention relates generally to a location based system, and more particularly to a system for managing contacts.

BACKGROUND ART

Modern portable consumer and industrial electronics, especially client devices such as navigation systems, smart phones, portable digital assistants, and combination devices are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to manage address books and contact lists containing names and contact information of people, places, or things.

Often, results are sought without considering relevant context or organization, which leaves the user inundated with useless results. Other times, the results are poorly organized and presented, which forces the user to spend more time and effort to make sense out of the presented results.

The need to reduce costs, improve efficiencies and performance, and meet competitive pressures adds an even greater urgency to the critical necessity for finding answers to these problems. However, solutions to these problems have been long sought but prior developments have not taught or suggested any solutions and, thus, solutions to these problems have long eluded those skilled in the art. Thus, a need still remains for a location based system with contextual contact manager.

DISCLOSURE OF THE INVENTION

The present invention provides a method of operation of a location based system including: detecting an event; establishing an event context time associated with the event; establishing a geofence associated with the event; and identifying an event participant, associated with the event, with the event participant within the geofence during the event context time for displaying on a device.

The present invention provides a location based system, including: an event context module for detecting an event; a contextual time module, coupled to the event context module, for establishing an event context time associated with the event; a geofence module, coupled to the event context module, for establishing a geofence associated with the event; and a filter module, coupled to the geofence module, for identifying an event participant, associated with the event, with the event participant within the geofence during the event context time for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
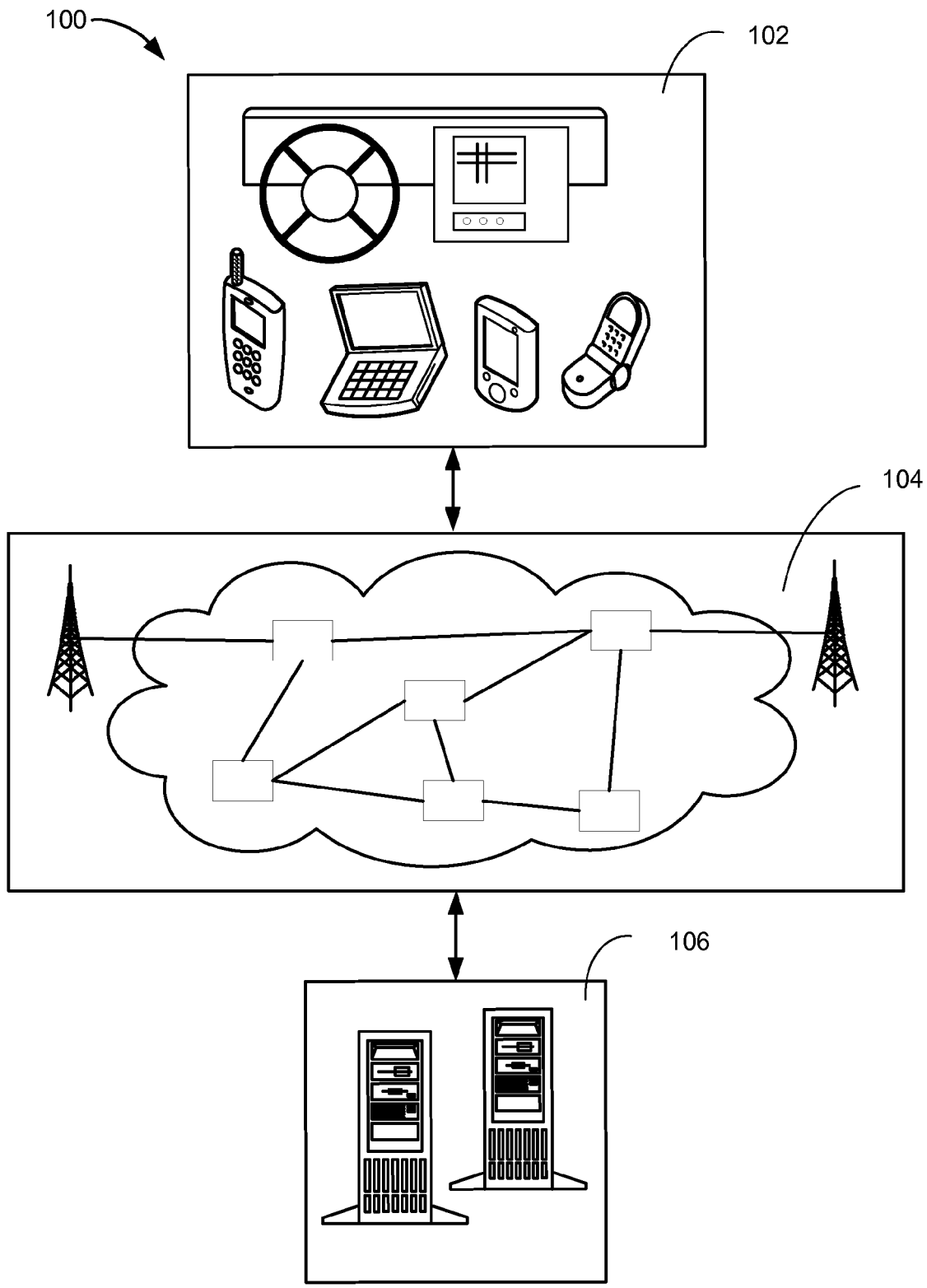
FIG. 1 is a location based system with contextual contact manager mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which location based information is expressed is not critical to some embodiments of the invention. For example, in some embodiments, location based information is presented in the format of, where X and Y are two ordinates that define the geographic location, i.e., a position of a user.

In an alternative embodiment, location based information is presented by longitude and latitude related information. In a further embodiment of the present invention, the location based information also includes a velocity element including a speed component and a heading component.

The term "relevant information" referred to herein comprises the location based information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system, passive devices, or a combination thereof.

Referring now to FIG. 1, therein is shown a location based system 100 with contextual contact manager mechanism in an embodiment of the present invention. The location based system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the location based system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10 Business Class mainframe or a HP ProLiant ML server. Yet another example, the second device 106 can be a particularized machine, such as a portable computing device, a thin client, a notebook, a netbook, a smartphone, personal digital assistant, or a cellular phone, and as specific examples, an Apple iPhone, Palm Centro, or Moto Q Global.

For illustrative purposes, the location based system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the location based system 100 is shown with the second device 106 and the first device 102 as end points of the communication path 104, although it is understood that the location based system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard, wireless fidelity, and worldwide interoperability for microwave access are examples of wireless communication that can be included in the communication path 104. Ethernet, digital subscriber line, fiber to the home, and plain old telephone service are examples of wired communication that can be included in the communication path 104.

Further, the communication path 104 can traverse a number of network topologies and distances. For example, the communication path 104 can include direct connection, personal area network, local area network, metropolitan area network, wide area network or any combination thereof.

Figure 2:
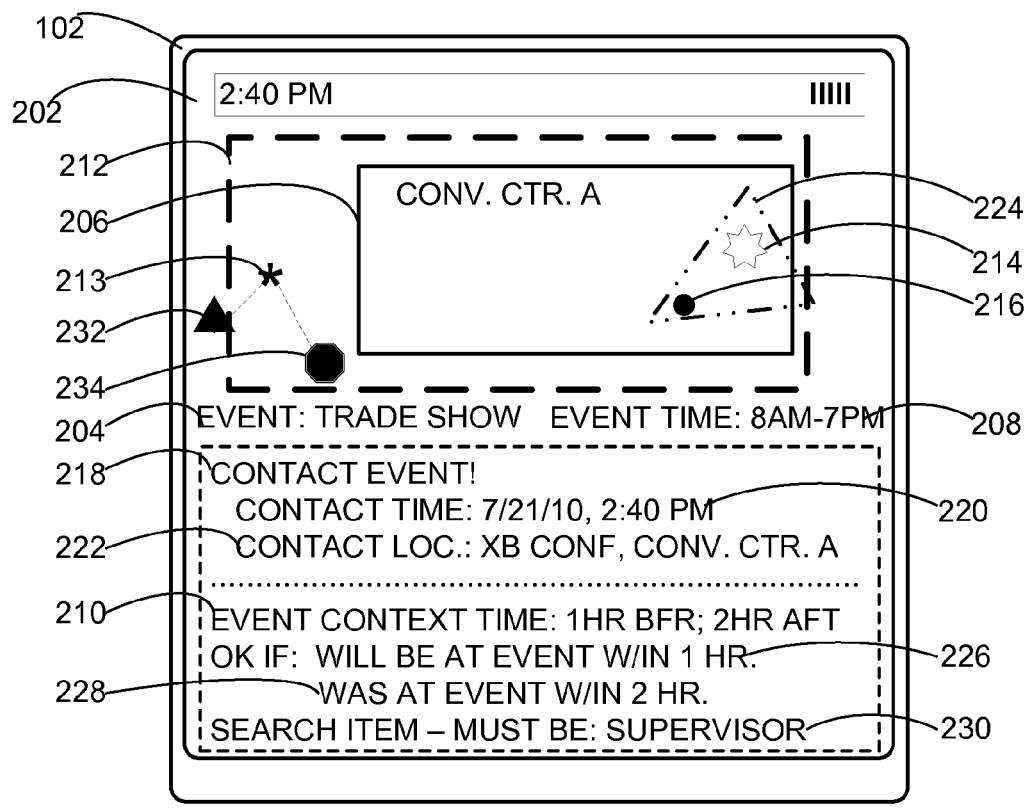
FIG. 2 is a first example application of a display interface of the first device.

Referring now to FIG. 2, therein is shown a first example application of a display interface 202 of the first device 102. The display interface 202 can show an event 204, an event location 206, an event time 208, an event context time 210, a geofence 212, an evaluation subject 213, and an event participant 214.

The event 204 is an occurrence or happening, or a social gathering at a given date or time. The event 204 can be represented by the purpose, title or name given to the occurrence, happening, or a social gathering. The event 204 can represent a specific event, such as birth of a baby or solar eclipse, or a social gathering, such as a birthday party or a trade show. The event 204 can also be the type of an event or the context for the event. For example, the event 204 can be the "Boston Marathon" or athletic contest, or the weekly staff meeting. The event 204 can have occurred in the past, is currently going on, or scheduled to be occurring in the future.

The event location 206 is the geographic location or region of the event 204. The event location 206 can be a geographic location, virtual location, or contact information such as a conference call number. For example, the event location 206 can be an address, set of cross streets, a famous landmark, or longitude and latitude coordinates. Also, for example, the event location 206 can be a web page, Net Meeting identifier, or a server address or name.

The event time 208 is the time period in which the event 204 has occurred, is occurring, or will be occurring. The event time 208 can be represented by the times at which the event 204 starts and ends, or by the time at which the event 204 starts and the length or duration of the event 204.

The event context time 210 is a block of time that identifies a time period associated with the event 204. For example, if the event 204 is a trade show with the event time 208 of 9:00 AM to 5:00 PM, the event context time 210 can be before, after, during, or a combination thereof. Continuing with the example, the event context time 210 can be 7:00 AM to 9:00 AM in the context of identifying the preparation crew, or 12:00 PM to 9:00 PM in the context of identifying the second shift of janitors working at the event 204.

The location based system 100 can use the event 204, the event location 206, the event time 208, the event context time 210 or a combination thereof to search for and locate a desired person, place, entity, contact, thing, or combination thereof. The detailed uses of the event 204, the event location 206, and the event time 208 will be discussed below.

The geofence 212 is a geographic area that is associated with the event 204. The geofence 212 can be a navigation boundary for finding a person, place, entity, contact, or a combination thereof that was, is, or will be participating in the event 204. The geofence 212 can also be the area which includes the event location 206 and the participating parking areas where the people participating in the event 204 can park their vehicles.

The geofence 212 can represent a navigation boundary by enclosing a region with a continuous line, without any disconnects. For example, the geofence 212 can be country borders, building outline, zoning boundaries, conference boundaries, or portions thereof. The geofence 212 can also represent a navigation boundary by selecting or highlighting a region, such as a park or a room.

The evaluation subject 213 is a person, entity, thing, or a combination thereof that is being evaluated as the event participant 214. The event participant 214 is a person, entity, thing or combination thereof that was, is, or will be part of the event 204.

The evaluation subject 213 can be the target that the user or the location based system 100 specifies for the purposes of identifying the event participant 214. For example, the evaluation subject 213 can be the person that the location based system 100 is evaluating to see if he/she is the event participant 214.

The event participant 214 can be a person or an entity that was, is, or will be at the event location 206 during the event time 208. For example, the event participant 214 can be a company that was at the meeting last month or a vendor representative registered to be at Trade Show X tomorrow.

The display interface 202 can also show a device location 216, a contact event 218, a contact time 220, a contact location 222, and a close contact boundary 224. The device location 216 is the current physical location of the first device 102. The device location 216 can be represented by a visual representation in relation to surrounding entities or by location information. For example, the device location 216 can be represented by a visual mark overlaid on a map or by set of coordinates, such as GPS coordinate or longitude and latitude.

The contact event 218 is a record of an occasion where the user interfaced with the event participant 214. The contact event 218 can be an occasion where the user met, spoke with, physically touched, or was within a certain distance from the user.

The contact time 220 is a record of when the contact event 218 occurred. The contact location 222 can represent the geographic location where the contact event 218 occurred. For example, the contact location 222 can be the event location 206, the conference hall name within the event location 206, a description of the location, such as "near the water fountain," or an identifier, such as an address or a set of coordinates.

The close contact boundary 224 is a threshold distance for defining the contact event 218. The close contact boundary 224 is used to define the contact event 218 when geographic location of the event participant 214 is within the close contact boundary 224. The close contact boundary 224 can be a boundary encircling the device location 216.

The display interface 202 can also show a future time period 226, a past time period 228, and a search item 230. The future time period 226 is a period of time used to include finding the sought person or thing that will be in the search area shortly. The future time period 226 can be a time period that can be used to find the event participant 214 that is scheduled to be within the geofence 212 within a time period not exceeding the future time period 226. For example, the future time period 226 can be set to 15 minutes to find the event participant 214 that will be arriving at the conference center 5 minutes later than scheduled.

The past time period 228 is a period of time used to find the person or item sought that has moved out of the search area. The past time period 228 can be a time period that can be used to find the event participant 214 that was within the geofence 212 until a time period not exceeding the past time period 228.

For example, the past time period 228 can be set to 2 hours to find the event participant 214 that has moved out of the geofence 212 an hour ago to grab lunch. Also, for example, the past time period 228 can be set to a day to find an employee that may have not shown up to work, described by the geofence 212, due to an illness.

The search item 230 is a person, a place, a thing, or a characteristic or a type associated with the person, the place, or the thing that is sought in the event participant 214. The search item 230 can be the characteristic, such as job title or physical attribute, which the event participant 214 must have. For example, the search item 230 can be "organizer" if the location based system 100 is trying to find someone within the geofence 212 during the event context time 210 that also helped organize the event itself.

The display interface 202 can also show location information of the evaluation subject 213. The display interface 202 can show a subject prior location 232 and a subject future location 234. The evaluation subject 213 can have the subject prior location 232 and/or the subject future location 234.

The subject prior location 232 is where the evaluation subject 213 was or is scheduled to be before a designated time. The subject prior location 232 can be represented by an address, cross streets, famous landmark, longitude and latitude coordinates, or a location in a virtual world. For example, in relation to the lunch meeting occurring on Jul. 11, 2009, between 12:00 pm to 1:30 pm, the subject prior location 232 can be the mall, where the meeting with the vendor scheduled between 10:00 am and 12:00 pm.

Similarly, the subject future location 234 is where the evaluation subject 213 is going to or scheduled to be after a designated time. Continuing with the previous example, in relation to the lunch meeting occurring on Jul. 11, 2009, between 12:00 pm to 1:30 pm, the subject future location 234 can be the convention center, where the evaluation subject 213 is scheduled to attend the trade conference from 1:30 pm to 4:00 pm.

Figure 3:
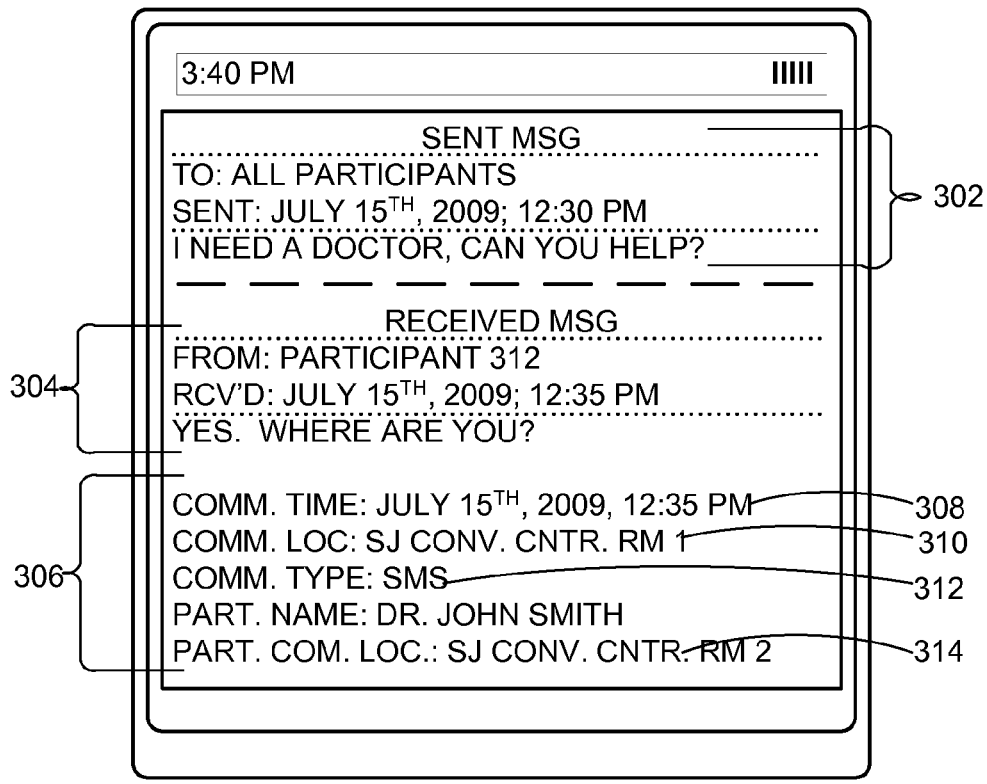
FIG. 3 is a second example application of the display interface.

Referring now to FIG. 3, therein is shown a second example application of the display interface 202. The display interface 202 can show a message 302, a reply message 304, a communication profile 306, a communication time 308, a communication location 310, a communication type 312, and a participant communication location 314.

The message 302 is the communication between user of the location based system 100 and the event participant 214 of FIG. 2. The message 302 can be conveyed as spoken communication, written communication, pictorial communication, video communication, or a combination thereof. For example, the message 302 can be a phone conversation, video conference, voice mail, short message system, or electronic mail.

The reply message 304 is a response from the event participant 214 to the user in the case that the message 302 did not provide for interactive participation from the event participant 214, such as in e-mail for SMS. For example, the reply message 304 can be a reply SMS to an e-mail or a call back in response to voice mail.

The communication profile 306 contains details of the communication between the user and the event participant 214. For example, the communication profile 306 can be a call log for a phone conversation or meeting minutes from a virtual conference meeting. The communication profile 306 can include details such as the identity of the event participant 214, the communication time 308, the communication location 310, the communication type 312, and the participant communication location 314.

The communication time 308 is a particular time or span of time of the communication between the user and the event participant 214. The communication time 308 can be the time when the message 302 started transmitting. When the reply message 304 exists, the communication time 308 can be the time when the reply message 304 started.

The communication time 308 can be represented in a number of different formats or with different relational information. For example, the communication time 308 can be represent with date and time information and format as Jul. 15, 2009, 12:30 pm. The communication time 308 can also be represented relative to the current date or time, such as "yesterday" or "an hour ago." The communication time 308 can also be represented relative to an event, such as "Day Two" of the conference.

The communication location 310 is a geographic location of where the user of the location based system 100 was when a particular communication occurred with the event participant 214. The communication location 310 can be represented by the event location 206 or the address or coordinate equivalent to where the user was at the communication time 308.

The participant communication location 314 is a geographic location of where the event participant 214 was when a particular communication occurred with the user of the location based system 100. The participant communication location 314 can be represented by the event location 206, by a relative location to the user of the location based system 100, or by the address or coordinate equivalent to where the event participant 214 was located at the communication time 308.

The communication type 312 is a type of communication between the user and the event participant 214. For example, the communication type 312 can denote whether the communication was via e-mail, SMS, video, virtual world, or over the phone.

Figure 4:
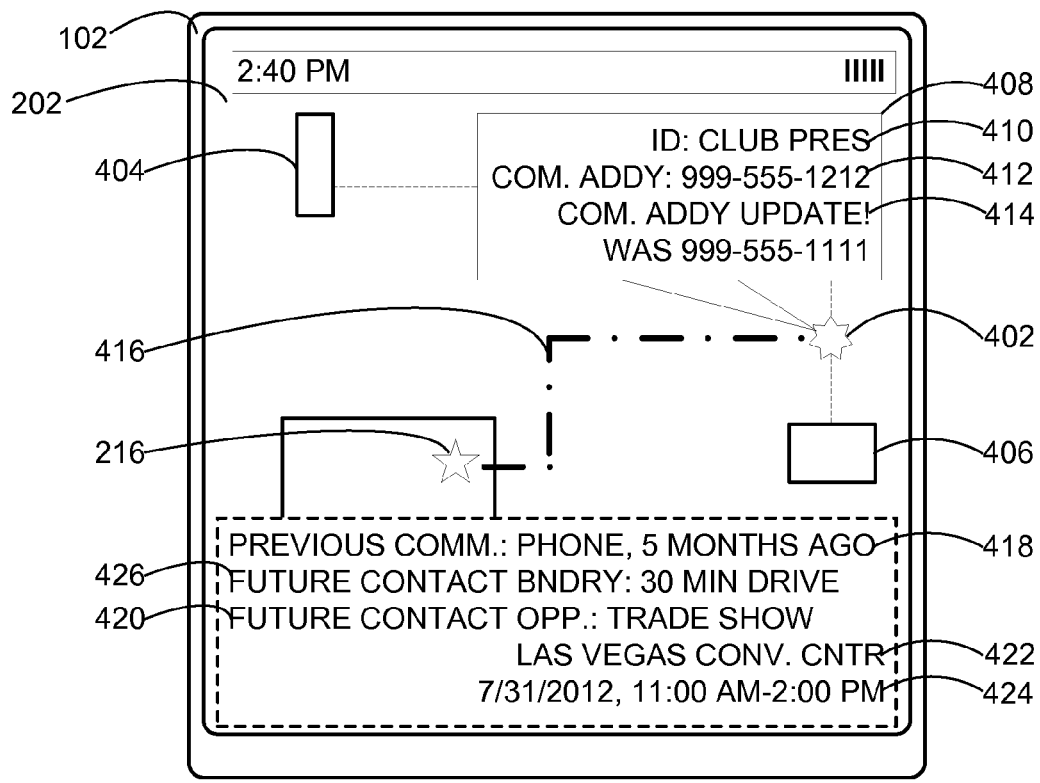
FIG. 4 is a third example application of the display interface.

Referring now to FIG. 4, therein is shown a third example application of the display interface 202. The display interface 202 can display a participant present location 402, a participant future location 404, and a participant prior location 406.

The participant present location 402 is the current geographic location of the event participant 214 of FIG. 2. The participant present location 402 can be represented by a visual representation in relation to surrounding entities or by location information. For example, the participant present location 402 can be represented by a visual mark overlaid on a map or by set of coordinates, such as GPS coordinate or longitude and latitude.

The participant future location 404 is the geographic location where the event participant 214 will be or is scheduled to be at a pre-determined time after the event context time 210 of FIG. 2. For example, the participant future location 404 can be the destination of the route that the event participant 214 is traversing. Also, for example, the participant future location 404 can be the location of Trade Show X, occurring tomorrow, to which the event participant 214 has registered to attend.

The participant prior location 406 is the geographic location where the event participant 214 was before the event context time 210. For example, the participant prior location 406 can be the location where the event participant 214 was before the event participant 214 started traversing to a location within the geofence 212. Also, for example, the participant prior location 406 can be the location where the event participant 214 had attended the meeting occurring two days before the event context time 210.

The display interface 202 can also display a participant profile 408, a participant identifier 410, a communication address 412, and a profile change notice 414. The participant profile 408 is a description of the event participant 214. For example, the participant profile 408 can include name, pseudonym, contact information, registration information, online profile, job title, age, physical attributes, or a combination thereof. The participant profile 408 can have the participant identifier 410 and the communication address 412.

The participant identifier 410 is a letter, number, symbol, or a combination thereof that distinguishes the event participant 214 from other person, place, or thing associated with the event 204. The participant identifier 410 can be a written or drawn designation that can be used to identify the event participant 214. For example, the participant identifier 410 can be the legal name or a pseudonym, such as a nickname or a screen name, a conference registration number or passport number, or a trademark.

The participant profile 408 can be defined by the event participant 214, the user, the location based system 100, or a combination thereof. For example, the participant profile 408 can be the self introduction of the event participant 214, the user's notes for remembering the event participant 214, or the account information associated with the event participant 214. The location based system 100 can search the internet or a data base and collect relevant information to define the participant profile 408.

The communication address 412 is a designation or an address that can be used to communicate with the event participant 214. For example, the communication address 412 can be a street address, phone number, an email address, or a website address.

The profile change notice 414 is an announcement that notifies the user of the location based system 100 that the participant profile 408 has changed. The profile change notice 414 can be a sound, a text, a drawing, a movement, or a combination thereof that communicates to the user that the participant profile 408 has been changed.

Along with the profile change notice 414, the location based system 100 can record the change to the participant profile 408 so that the user can access the participant profile 408 that has been updated. The operations of updating and recording will be discussed in more detail below.

The display interface 202 can also display an ingress travel route 416, a previous-communication reminder 418, a future contact opportunity 420, an opportune location 422, an opportune time 424, and a future contact boundary 426. The ingress travel route 416 is the route that the event participant 214 can traverse to go from the participant present location 402 to the device location 216. The event participant 214 can traverse the ingress travel route 416 to meet the user at user's present location.

The previous-communication reminder 418 is a notice to remind the user of the location based system 100 that the user has communicated with the event participant 214 in the past and the details of the last occurring communication. The location based system 100 can display the previous-communication reminder 418 if the event participant 214 has ever communicated with the user using any available means of communication. The previous-communication reminder 418 can also display when the last communication occurred and the means of the communication.

The future contact opportunity 420 is a time and place, or an event in the future where the user is scheduled be within a threshold distance or a threshold time from the event participant 214. The future contact opportunity 420 can be used to schedule a meeting with the event participant 214.

The future contact opportunity 420 can include the opportune location 422 and the opportune time 424. The opportune location 422 is a possible location for the future contact opportunity 420. The opportune location 422 is either a physical location or a virtual location, which is a location in a computer simulation or in a computer simulated world. The opportune location 422 can be the location where the event participant 214 is scheduled to be within the future contact boundary 426.

The opportune time 424 is a possible time of the future contact opportunity 420. The opportune time 424 can be the date and time when the event participant 214 is scheduled to be within the future contact boundary 426.

The future contact boundary 426 is a threshold distance or a threshold time for determining the future contact opportunity 420. The future contact opportunity 420 can be defined as when the event participant 214 is scheduled to be within the future contact boundary 426 and thus near where the user is scheduled to be concurrently.

The future contact boundary 426 can be determined as a set distance, such as 5 miles or within the building where the meeting is held, encompassing where the user is scheduled to be at a future time. The future contact boundary 426 can also be determined as an estimated time, such as 15 minute drive or 10 minute walk. The future contact boundary 426 can be determined by the user, the location based system 100, or a combination thereof.

The future contact opportunity 420 can be the event 204 of FIG. 2 occurring in the future, that both the user and the event participant 214 will attend. For example, if both the user and the event participant 214 are scheduled to attend next week's trade show, the trade show can be the future contact opportunity 420 where the two can meet. The event location 206 of FIG. 2 can be the opportune location 422 and the event time 208 of FIG. 2 can be the opportune time 424.

The future contact opportunity 420 can also be the event 204 the event participant 214 will attend, where the event location 206 is within the future contact boundary 426. For example, if the event participant 214 is scheduled to be within 5 miles of the user during a time when the user will be at a convention, the convention can be the future contact opportunity 420. In the example, the scheduled location of the event participant 214 can be the opportune location 422. Similarly, the time period during which the event participant 214 will be within the threshold distance can be the opportune time 424.

Figure 5:
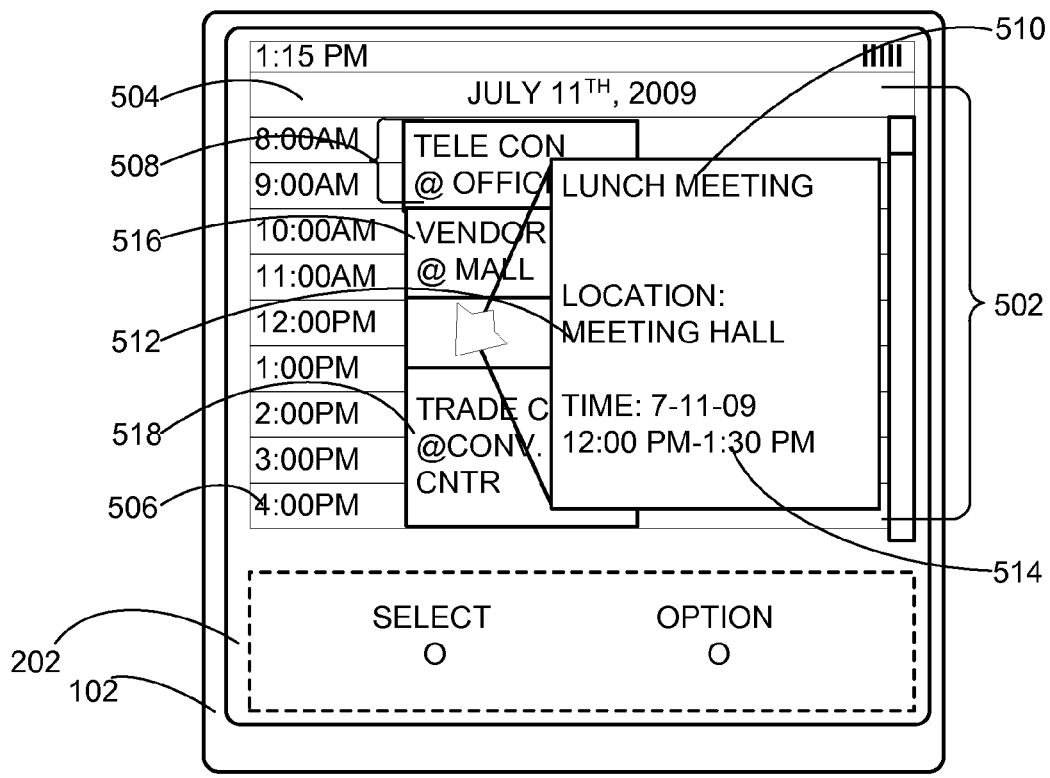
FIG. 5 is a fourth example of the display interface of the first device.

Referring now to FIG. 5, therein is shown a fourth example of the display interface 202 of the first device 102. The display interface 202 can display a schedule calendar 502.

The schedule calendar 502 is a representation of time and scheduled events of a person, entity, or thing. For example, the schedule calendar 502 can be an electronic calendar, such as Microsoft Outlook, or a flight schedule. The schedule calendar 502 can have a calendar date 504, a time segment 506, a calendar event 508, an appointment purpose 510, an appointment location 512, an appointment time period 514, a participant prior location 516, and a participant future location 518.

The calendar date 504 is a date within the schedule calendar 502. The time segment 506 divides up the time represented in the calendar date 504. For example, the time segment 506 can be a minute, an hour, a day, a week, or a combination thereof or spanning a multiple of each.

The calendar event 508 is a scheduled event or a tentatively scheduled event. The calendar event 508 can represent a meeting, a task, or a reminder. For example, the calendar event 508 can be teleconference with a vendor or a reminder to attend a trade conference. The calendar event 508 can have the appointment purpose 510, the appointment location 512, and the appointment time period 514.

The appointment purpose 510 is the purpose of the calendar event 508. For example, the appointment purpose 510 can be the title of the calendar event, such as "Lunch Meeting" or Trade Conference. Also, for example, the appointment purpose 510 can represent the type, goal, or desired attendee for the meeting.

The appointment location 512 is the geographic location, a virtual location, or contact information such as a conference call number for the calendar event 508. For example, the appointment location 512 can be set by selecting an address, cross streets, a famous landmark, or longitude and latitude coordinates. The appointment location 512 can also represent a location in a virtual world.

The participant prior location 516 is where the subject or user of the schedule calendar 502 was or is scheduled to be before a designated time. The participant prior location 516 can be represented by an address, cross streets, famous landmark, longitude and latitude coordinates, or a location in a virtual world. For example, in relation to the lunch meeting occurring on Jul. 11, 2009, between 12:00 pm to 1:30 pm, the participant prior location 516 can be the mall, where the meeting with the vendor scheduled between 10:00 am and 12:00 pm.

Similarly, the participant future location 518 is where the subject or user of the schedule calendar 502 is going to or scheduled to be after a designated time. Continuing with the previous example, in relation to the lunch meeting occurring on Jul. 11, 2009, between 12:00 pm to 1:30 pm, the participant future location 518 can be the convention center, where the event participant 214 is scheduled to attend the trade conference from 1:30 pm to 4:00 pm.

Figure 6:
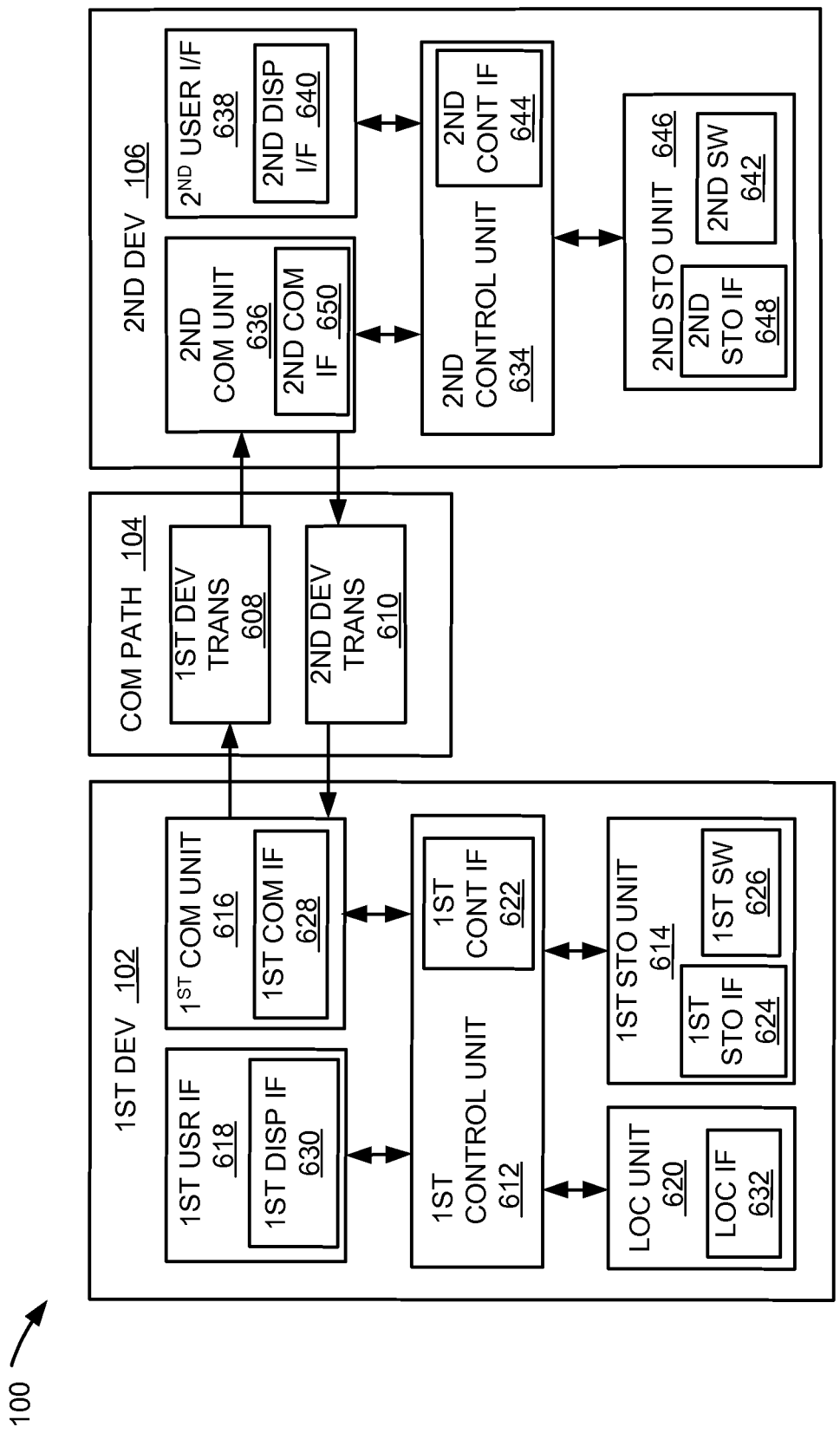
FIG. 6 is an exemplary block diagram of the location based system.

Referring now to FIG. 6, therein is shown an exemplary block diagram of the location based system 100. The location based system 100 can include the first device 102, the communication path 104, and the second device 106.

The first device 102 can communicate with the second device 106 over the communication path 104. For example, the first device 102, the communication path 104, and the second device 106 can be the first device 102 of FIG. 1, the communication path 104 of FIG. 1, and the second device 106 of FIG. 1, respectively. The screen shot shown on the display interface 202 described in FIG. 2 can represent the screen shot for the location based system 100.

The first device 102 can send information in a first device transmission 608 over the communication path 104 to the second device 106. The second device 106 can send information in a second device transmission 610 over the communication path 104 to the first device 102.

For illustrative purposes, the location based system 100 is shown with the first device 102 as a client device, although it is understood that the location based system 100 can have the first device 102 as a different type of device. For example, the first device 102 can be a server.

Also for illustrative purposes, the location based system 100 is shown with the second device 106 as a server, although it is understood that the location based system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 612, a first storage unit 614, a first communication unit 616, a first user interface 618, and a location unit 620. The first device 102 can be similarly described by the first device 102. The first control unit 612 can include a first control interface 622. The first storage unit 614 can include a first storage interface 624.

The first control unit 612 can execute a first software 626 to provide the intelligence of the location based system 100. The first control unit 612 can operate the first user interface 618 to display information generated by the location based system 100. The first control unit 612 can also execute the first software 626 for the other functions of the location based system 100, including receiving location information from the location unit 620. The first control unit 612 can further execute the first software 626 for interaction with the communication path 104 of FIG. 1 via the first communication unit 616.

The first control unit 612 can be implemented in a number of different manners. For example, the first control unit 612 can be a processor, an embedded processor, a microprocessor, a hardware control logic, a hardware finite state machine, a digital signal processor, or a combination thereof.

The first control unit 612 can include the first control interface 622. The first control interface 622 can be used for communication between the first control unit 612 and other functional units in the first device 102. The first control interface 622 can also be used for communication that is external to the first device 102.

The first control interface 622 can receive information from the other functional units or from external sources, or can transmit information to the other functional units or to external destinations. The external sources and the external destinations refer to sources and destinations external to the first device 102.

The first control interface 622 can be implemented in different ways and can include different implementations depending on which functional units or external units are being interfaced with the first control interface 622. For example, the first control interface 622 can be implemented with a pressure sensor, an inertial sensor, a microelectromechanical system, optical circuitry, waveguides, wireless circuitry, wireline circuitry, or a combination thereof.

The first storage unit 614 can store the first software 626. The first storage unit 614 can also store the relevant information, such as advertisements, points of interest, navigation routing entries, or any combination thereof.

The first storage unit 614 can be a volatile memory, a nonvolatile memory, an internal memory, an external memory, or a combination thereof. For example, the first storage unit 614 can be a nonvolatile storage such as nonvolatile random access memory, Flash memory, disk storage, or a volatile storage such as static random access memory.

The first storage unit 614 can include the first storage interface 624. The first storage interface 624 can be used for communication between the location unit 620 and other functional units in the first device 102. The first storage interface 624 can also be used for communication that is external to the first device 102.

The first storage interface 624 can receive information from the other functional units or from external sources, or can transmit information to the other functional units or to external destinations. The external sources and the external destinations refer to sources and destinations external to the first device 102.

The first storage interface 624 can include different implementations depending on which functional units or external units are being interfaced with the first storage unit 614. The first storage interface 624 can be implemented with technologies and techniques similar to the implementation of the first control interface 622.

The first communication unit 616 can enable external communication to and from the first device 102. For example, the first communication unit 616 can permit the first device 102 to communicate with the second device 106 of FIG. 1, an attachment, such as a peripheral device or a computer desktop, and the communication path 104.

The first communication unit 616 can also function as a communication hub allowing the first device 102 to function as part of the communication path 104 and not limited to be an end point or terminal unit to the communication path 104. The first communication unit 616 can include active and passive components, such as microelectronics or an antenna, for interaction with the communication path 104.

The first communication unit 616 can include a first communication interface 628. The first communication interface 628 can be used for communication between the first communication unit 616 and other functional units in the first device 102. The first communication interface 628 can receive information from the other functional units or can transmit information to the other functional units.

The first communication interface 628 can include different implementations depending on which functional units are being interfaced with the first communication unit 616. The first communication interface 628 can be implemented with technologies and techniques similar to the implementation of the first control interface 622.

The first user interface 618 allows a user to interface and interact with the first device 102. The first user interface 618 can include an input device and an output device. Examples of the input device of the first user interface 618 can include a keypad, a touchpad, soft-keys, a keyboard, a microphone, or any combination thereof to provide data and communication inputs.

The first user interface 618 can include a first display interface 630. Examples of the output device of the first user interface 618 can include the first display interface 630. The first display interface 630 can include a display, a projector, a video screen, a speaker, or any combination thereof.

The location unit 620 can generate location information, current heading, and current speed of the first device 102, as examples. The location unit 620 can be implemented in many ways. For example, the location unit 620 can function as at least a part of a global positioning system, an inertial navigation system, a cellular-tower location system, a pressure location system, or any combination thereof.

The location unit 620 can include a location interface 632. The location interface 632 can be used for communication between the location unit 620 and other functional units in the first device 102. The location interface 632 can also be used for communication that is external to the first device 102.

The location interface 632 can receive information from the other functional units or from external sources, or can transmit information to the other functional units or to external destinations. The external sources and the external destinations refer to sources and destinations external to the first device 102.

The location interface 632 can include different implementations depending on which functional units or external units are being interfaced with the location unit 620. The location interface 632 can be implemented with technologies and techniques similar to the implementation of the first control unit 612.

For illustrative purposes, the first device 102 is shown with the partition having the first control unit 612, the first storage unit 614, the first user interface 618, the first communication unit 616, and the location unit 620 although it is understood that the location based system 100 can have a different partition. For example, the first software 626 can be partitioned differently such that some or all of its function can be in the first control unit 612, the location unit 620, and the first communication unit 616. Also, the first device 102 can include other functional units not shown in FIG. 6 for clarity.

The functional units in the first device 102 can work individually and independently of the other functional units. The first device 102 can work individually and independently from the second device 106 and the communication path 104.

The second device 106 can be optimized for implementing the present invention in a multiple device embodiment with the first device 102. The second device 106 can provide the additional or higher performance processing power compared to the first device 102. The second device 106 can include a second control unit 634, a second communication unit 636, and a second user interface 638.

The second user interface 638 allows a user to interface and interact with the second device 106. The second user interface 638 can include an input device and an output device. Examples of the input device of the second user interface 638 can include a keypad, a touchpad, soft-keys, a keyboard, a microphone, or any combination thereof to provide data and communication inputs. Examples of the output device of the second user interface 638 can include a second display interface 640. The second display interface 640 can include a display, a projector, a video screen, a speaker, or any combination thereof.

The second control unit 634 can execute a second software 642 to provide the intelligence of the second device 106 of the location based system 100. The second software 642 can operate in conjunction with the first software 626. The second control unit 634 can provide additional performance compared to the first control unit 612.

The second control unit 634 can operate the second user interface 638 to display information. The second control unit 634 can also execute the second software 642 for the other functions of the location based system 100, including operating the second communication unit 636 to communicate with the first device 102 over the communication path 104.

The second control unit 634 can be implemented in a number of different manners. For example, the second control unit 634 can be a processor, an embedded processor, a microprocessor, a hardware control logic, a hardware finite state machine, a digital signal processor, or a combination thereof.

The second control unit 634 can include a second controller interface 644. The second controller interface 644 can be used for communication between the second control unit 634 and other functional units in the second device 106. The second controller interface 644 can also be used for communication that is external to the second device 106.

The second controller interface 644 can receive information from the other functional units or from external sources, or can transmit information to the other functional units or to external destinations. The external sources and the external destinations refer to sources and destinations external to the second device 106.

The second controller interface 644 can be implemented in different ways and can include different implementations depending on which functional units or external units are being interfaced with the second controller interface 644. For example, the second controller interface 644 can be implemented with a pressure sensor, an inertial sensor, a micro electromechanical system, optical circuitry, waveguides, wireless circuitry, wireline circuitry, or a combination thereof.

A second storage unit 646 can store the second software 642. The second storage unit 646 can also store the relevant information, such as advertisements, points of interest, navigation routing entries, or any combination thereof. The second storage unit 646 can be sized to provide the additional storage capacity to supplement the first storage unit 614.

For illustrative purposes, the second storage unit 646 is shown as a single element, although it is understood that the second storage unit 646 can be a distribution of storage elements. Also for illustrative purposes, the location based system 100 is shown with the second storage unit 646 as a single hierarchy storage system, although it is understood that the location based system 100 can have the second storage unit 646 in a different configuration. For example, the second storage unit 646 can be formed with different storage technologies forming a memory hierarchal system including different levels of caching, main memory, rotating media, or off-line storage.

The second storage unit 646 can be a volatile memory, a nonvolatile memory, an internal memory, an external memory, or a combination thereof. For example, the second storage unit 646 can be a nonvolatile storage such as non-volatile random access memory, Flash memory, disk storage, or a volatile storage such as static random access memory.

The second storage unit 646 can include a second storage interface 648. The second storage interface 648 can be used for communication between the location unit 620 and other functional units in the second device 106. The second storage interface 648 can also be used for communication that is external to the second device 106.

The second storage interface 648 can receive information from the other functional units or from external sources, or can transmit information to the other functional units or to external destinations. The external sources and the external destinations refer to sources and destinations external to the second device 106.

The second storage interface 648 can include different implementations depending on which functional units or external units are being interfaced with the second storage unit 646. The second storage interface 648 can be implemented with technologies and techniques similar to the implementation of the second controller interface 644.

The second communication unit 636 can enable external communication to and from the second device 106. For example, the second communication unit 636 can permit the second device 106 to communicate with the first device 102 over the communication path 104.

The second communication unit 636 can also function as a communication hub allowing the second device 106 to function as part of the communication path 104 and not limited to be an end point or terminal unit to the communication path 104. The second communication unit 636 can include active and passive components, such as microelectronics or an antenna, for interaction with the communication path 104.

The second communication unit 636 can include a second communication interface 650. The second communication interface 650 can be used for communication between the second communication unit 636 and other functional units in the second device 106. The second communication interface 650 can receive information from the other functional units or can transmit information to the other functional units.

The second communication interface 650 can include different implementations depending on which functional units are being interfaced with the second communication unit 636. The second communication interface 650 can be implemented with technologies and techniques similar to the implementation of the second controller interface 644.

The first communication unit 616 can couple with the communication path 104 to send information to the second device 106 in the first device transmission 608. The second device 106 can receive information in the second communication unit 636 from the first device transmission 608 of the communication path 104.

The second communication unit 636 can couple with the communication path 104 to send information to the first device 102 in the second device transmission 610. The first device 102 can receive information in the first communication unit 616 from the second device transmission 610 of the communication path 104. The location based system 100 can be executed by the first control unit 612, the second control unit 634, or a combination thereof.

For illustrative purposes, the second device 106 is shown with the partition having the second user interface 638, the second storage unit 646, the second control unit 634, and the second communication unit 636, although it is understood that the second device 106 can have a different partition. For example, the second software 642 can be partitioned differently such that some or all of its function can be in the second control unit 634 and the second communication unit 636. Also, the second device 106 can include other functional units not shown in FIG. 6 for clarity.

The functional units in the second device 106 can work individually and independently of the other functional units. The second device 106 can work individually and independently from the first device 102 and the communication path 104.

For illustrative purposes, the location based system 100 is described by operation of the first device 102 and the second device 106. It is understood that the first device 102 and the second device 106 can operate any of the modules and functions of the location based system 100. For example, the first device 102 is described to operate the location unit 620, although it is understood that the second device 106 can also operate the location unit 620.

Figure 7:
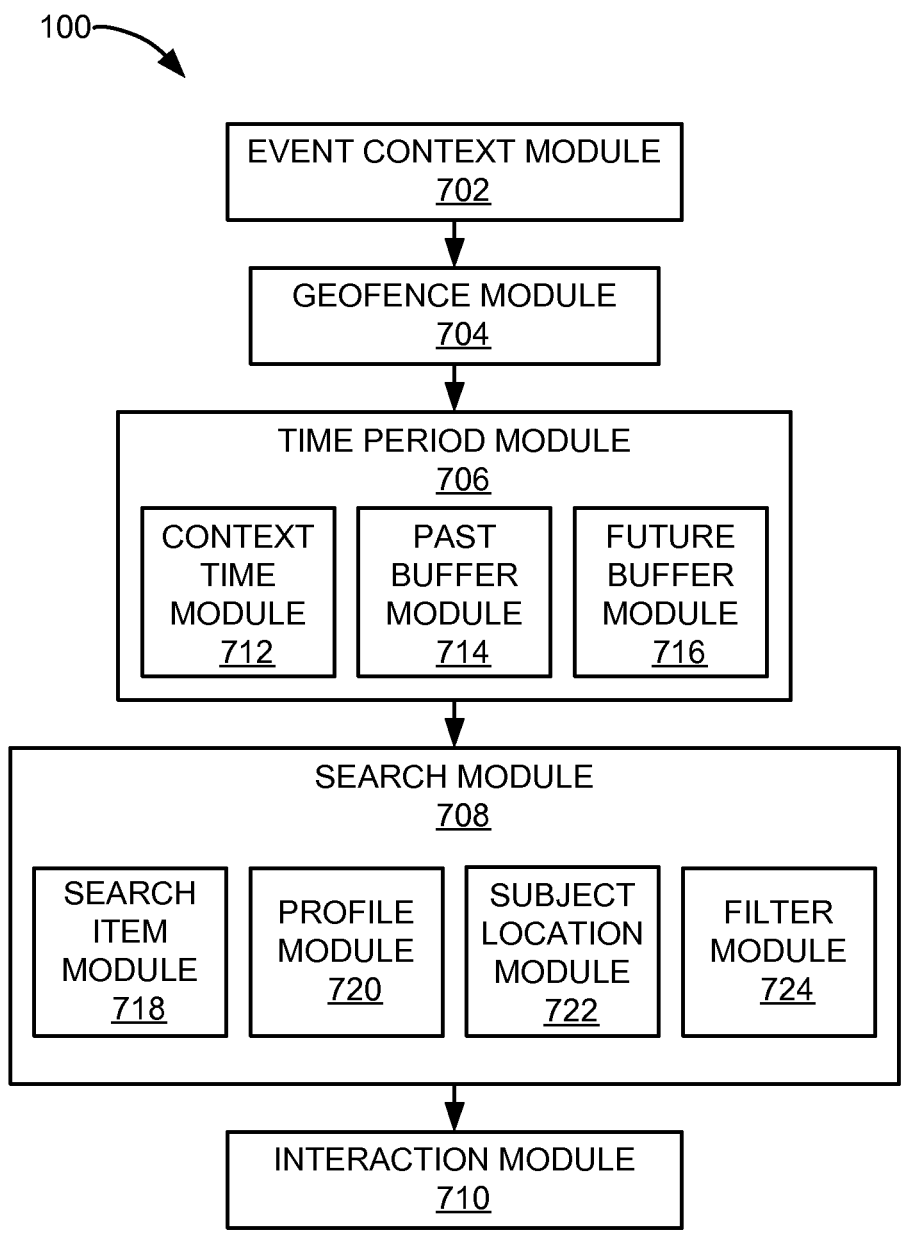
FIG. 7 is a control flow of the location based system.

Referring now to FIG. 7, therein is shown a control flow of the location based system 100. The location based system 100 can include an event context module 702, a geofence module 704, a time period module 706, a search module 708, and an interaction module 710.

The event context module 702 can be coupled to the geofence module 704, and the geofence module 704 can be coupled to the time period module 706. The time period module 706 can be then coupled to the search module 708, and the search module 708 can be coupled to the interaction module 710.

The purpose of the event context module 702 is to detect the event 204 of FIG. 2 by recognizing or determining the existence of the event 204. The event context module 702 can detect the event 204 by searching for the calendar event 508 of FIG. 5 in the user's calendar that has certain types, significance, or combination thereof.

The event context module 702 can detect the calendar event 508 that has a specific purpose, time, location, significance, a combination thereof, as the event 204. For example, calendar events such as status meetings, lunch appointments recurring on the same day of the week and/or at the same location, or the birth of a child can be detected as the event 204.

The event context module 702 can be predetermined to recognize certain purpose, types or significance, such as trade shows or meetings, as events. The user, the location based system 100, the software manufacturer, or a combination thereof can predetermine various types, such as vendor present meetings or conferences, or key phrases such as "board meeting" or "annual meeting." The event context module 702 can compare the calendar event 508 or the appointment purpose 510 to such types or search within them for the key phrases.

The event context module 702 can also detect the event 204 by searching the World Wide Web for content that matches the calendar event 508. The event context module 702 can search for a web page that contain the calendar event 508, the appointment purpose 510 of FIG. 5, the appointment location 512 of FIG. 5, the appointment time period 514 of FIG. 5, or a combination thereof.

For example, if the user is scheduled to attend a Trade Show X, the event context module 702 can search the Internet for a web page that includes any combination of dates and times, title, purpose, or location that matches the contents of the calendar event 508 Trade Show X in the user's calendar. If such web page is found, the event context module 702 can detect the calendar event 508 as the event 204.

The event 204 can be used by the search module 708 to identify the event participant 214 of FIG. 2. The event context module 702 can then pass the event 204 and the associated items, such as the event time 208 or the event location 206, to the geofence module 704.

The event context module 702 can utilize the first control unit 612 of FIG. 6 or the second control unit 634 of FIG. 6 to detect the event 204. The event context module 702 can store and access the event 204 using the first storage unit 614 of FIG. 6 or the second storage unit 646 of FIG. 6. The event context module 702 can use a combination of the first device 102 of FIG. 6 and the second device 106 of FIG. 6 through the communication path 104 of FIG. 6. For example, the event context module 702 can detect the event 204 on the first device 102 and store it in the second device 106. The event context module 702 can be a separate functional unit within the first device 102 or the second device 106 or can be a hardware unit within the first control unit 612 or the second control unit 634.

The purpose of the geofence module 704 is to establish the geofence 212 of FIG. 2 associated with the event 204. The geofence 212 can be used to identify the event participant 214. The geofence module 704 can establish the geofence 212, which can be the area beyond or including the event location 206 that is associated with the event 204.

For example, the geofence module 704 can select a country, a state, a city, or can enclose a region on a map using the first user interface 618 of FIG. 6. The outer boundaries of the selected region can be the geofence 212.

The geofence module 704 can query and receive user input to establish the geofence 212. The user can draw the geofence 212 using the first user interface 618. The geofence module 704 can generate a radius to define a circular area with the first device 102 of FIG. 6 at the center as the geofence 212.

The geofence module 704 can also establish the geofence 212 based on the event location 206. The geofence module 704 can establish the geofence 212 by selecting the boundaries of the event location 206. For example, the geofence module 704 can establish the location of the walls of the conference room where the meeting is held as the geofence 212. Also for example, the geofence module 704 can establish the property lines of the expo center where the trade show is being held as the geofence 212.

The geofence module 704 can also establish the geofence 212 by generating a radius to define a circular area with the event location 206 as the center. For example, the geofence module 704 can generate a radius of 5 miles to establish the geofence 212 as all areas within 5 mile distance from the event location 206.

Alternatively, the geofence module 704 can establish the geofence 212 by selecting the adjacent surrounding city blocks or entities. For example, the surrounding entities can be parking structures or restaurants participating in the event 204. The geofence module 704 can establish the outer perimeters of the city blocks or entities as the geofence 212.

For example, the geofence module 704 can establish the geofence 212 of a parade as two city blocks. The geofence 212 in such example would encompass the city blocks that are adjacent to the parade route and the city blocks that are adjacent to the first set of blocks.

The geofence module 704 can use the first control unit 612 and the location unit 620 of FIG. 6, or the second control unit 634 to establish the geofence 212. The geofence module 704 can also use a combination of the first control unit 612 and the second control unit 634 to establish the geofence 212. The geofence module 704 can store the geofence 212 in the first storage unit 614, the second storage unit 646, or a combination thereof.

The purpose of the time period module 706 is to define the time related search parameters for identifying and locating the event participant 214. For example, the time period module 706 can define the event context time 210 of FIG. 2 and the future time period 226 of FIG. 2. The time period module 706 can include a context time module 712, a past buffer module 714, and a future buffer module 716.

The purpose of the context time module 712 is to set the event context time 210 associated with the event 204. The event context time 210 can be used to identify and locate the event participant 214 that was, is, or is scheduled to be within the geofence 212 during the event context time 210. The context time module 712 can query and receive user input to define the event context time 210.

The context time module 712 can also set the event context time 210 based on the event time 208. The context time module 712 can establish the event context time 210 by selecting a time period extending and/or existing before and after the event time 208.

The amount of time added or selected to the event time 208 can be based on the event 204. For example, the event context time 210 corresponding to the event 204 of Self-Improvement may be defined as an hour before and none after the event time 208 of FIG. 2, or as after-work hours.

The context time module 712 can also establish the event context time 210 based on user preference, past history, or a combination thereof. For example, the context time module 712 can suggest the event context time 210 of the calendar event 508 that is similar to the event 204, which has occurred in the past and similar or the same as the calendar event 508.

The context time module 712 can determine the calendar event 508 to be similar to the event 204 if the titles are the same. The context time module 712 can also determine similarity if the calendar event 508 occurs at the same time of the day, week, month, or year, or at the same location, or a combination thereof as the event 204.

The context time module 712 can utilize the first control unit 612, the second control unit 634, or a combination thereof to select the event context time 210. The context time module 712 can store the event context time 210 in the first storage unit 614, the second storage unit 646, or a combination thereof.

The purpose of the future buffer module 716 is to set the future time period 226 for identifying the event participant 214 that will be arriving in the geofence 212 within the future time period 226. The future time period 226 can be used for identifying the event participant 214 that will be arriving in the geofence 212 within the future time period 226.

The future time period 226 can be used to determine how much later than the event context time 210 a person, entity, or thing can arrive within the geofence 212 and still be considered as the event participant 214. The future buffer module 716 can set the future time period 226 by selecting a length of time that can be compared to the time necessary for the event participant 214 to move within the geofence 212.

The future buffer module 716 can set the future time period 226 by having a predetermined length of time set by the user, the location based system 100, or a combination thereof. The future buffer module 716 can also set the future time period 226 by dynamically querying the user and receiving user inputs.

The future buffer module 716 can also set the future time period 226 based on the event 204. For example, if the event 204 requires international travel from the event participant 214 or the user, such as in United Nations meeting or the World Cup, the future buffer module 716 can set the future time period 226 to one day.

The future buffer module 716 can also set the future time period 226 based on the event 204 by assigning a predetermined value associated with the event 204. Such list can be pre-determined by the user, the location based system 100, or a combination thereof. For example, the user may assign 5 minutes as the future time period 226 for all lunch appointments. Also, for example, the location based system 100 may assign 1 day as the future time period 226 for a United Nations meeting.

The future buffer module 716 can also set the future time period 226 based on the event 204 by user preference or past selections, or in proportion or relative to the event time 208. For example, if the user or the location based system 100 has previously selected the future time period 226 as 5 minutes for a lunch appointment, the future buffer module 716 can set the future time period 226 to one hour for an upcoming lunch appointment.

The evaluation subject 213 can be identified as the event participant 214 that will be within the geofence 212, if the time necessary for the event participant 214 to move within the geofence 212 is less than or equal to the future time period 226. For example, with the future time period 226 set to 30 minutes, the location based system 100 can find the event participant 214 that is running five minutes late or is scheduled to return from lunch in 10 minutes.

The purpose of the past buffer module 714 is to set the past time period 228 of FIG. 2. The past time period 228 can be used for identifying the event participant 214 that was within the geofence 212 within the past time period 228. The operation of the past buffer module 714 in setting the past time period 228 can be similar to the future buffer module 716 setting the future time period 226.

The evaluation subject 213 can be identified as the event participant 214 that was within the geofence 212, if the evaluation subject 213 has been outside the geofence 212 for an amount of time that is less than or equal to the past time period 228. For example, with the past time period 228 set to one day, the location based system 100 can find the evaluation subject 213 that stepped out of the geofence 212 five minutes ago to receive a phone call or left the conference one day early.

The future buffer module 716 and the past buffer module 714 can use the first control unit 612, the second control unit 634, or a combination thereof to set the past time period 228 and the future time period 226. The future buffer module 716 and the past buffer module 714 can use the first storage unit 614, the second storage unit 646, or a combination thereof to store the past time period 228 and the future time period 226.

The purpose of the search module 708 is to find and locate the event participant 214. The search module 708 can include a search item module 718, a profile module 720, a subject location module 722, and a filter module 724.

The purpose of the search item module 718 is to identify the search item 230 of FIG. 2. The search item 230 can be used to further specify the event participant 214. The search item module 718 can query the user to identify the search item 230. The search item module 718 can also identify the search item 230 based on user preference or previous selections.

The search item module 718 can also identify the search item 230 based on the event 204. For example, if the user is attending a speed dating event seeking to meet women, the search item module 718 can identify the search item 230 as woman.

The search item module 718 can use the first control unit 612, the second control unit 634, the communication path 104, or a combination thereof to identify the search item 230. The search item 230 can be stored on the first storage unit 614, the second storage unit 646, or a combination thereof.

The purpose of the profile module 720 is to identify the participant profile 408 of FIG. 4 of the event participant 214. The participant profile 408 can have the participant identifier 410 of FIG. 4, and the communication address 412 of FIG. 4, along with other information such as job title, notes, preferences, or availability. The profile module 720 can identify the participant profile 408 that is available on the location based system 100 or search the internet or a data base.

For example, the profile module 720 can access the personal or professional web page of a person or company to identify the profile belonging to such person or company. Also, for example, the profile module 720 can search the internet or data bases to find publicly available information such as job title or function, attributes, characteristics, or descriptions associated with the evaluation subject 213.

The profile module 720 can use the first control unit 612, the second control unit 634, the communication path 104, or a combination thereof to set or access the participant profile 408. The participant profile 408 can be set and stored on the first storage unit 614, the second storage unit 646, or a combination thereof.

The purpose of the subject location module 722 is to identify the evaluation subject 213, associated with the event 204 and having the subject future location 234 of FIG. 2 and the subject prior location 232 of FIG. 2 for identifying the event participant 214. The subject location module 722 can identify and locate a person, an entity, or a thing that will be evaluated for the purpose of identifying the event participant 214.

The subject location module 722 can identify the evaluation subject 213 by extracting a name or identity from a registration or reservation for the event 204. The subject location module 722 can also identify the evaluation subject 213 by querying and taking feedback from the user.

The subject location module 722 can locate the evaluation subject 213 by obtaining the location information of the first device 102 belonging to the evaluation subject 213. For example, the subject location module 722 can triangulate the position of the mobile phone or obtain the GPS coordinate from the location based unit belonging to the evaluation subject 213.

The subject location module 722 can also search the schedule calendar 502 of FIG. 5 belonging to the evaluation subject 213. The subject location module 722 can then locate the evaluation subject 213 by obtaining the location information according to the appointment location 512 of FIG. 5 and the appointment time period 514 of FIG. 5.

The subject location module 722 can search the schedule calendar 502 for the calendar event 508 having the appointment time period 514 that includes the current time. The subject location module 722 can extract the appointment location 512 from the calendar event 508 as the location information.

The subject location module 722 can identify the evaluation subject 213 for identifying the event participant 214 that was within the geofence 212 within the past time period 228. The subject location module 722 can also identify the evaluation subject 213 for identifying the event participant 214 that will be within the geofence 212 within the future time period 226.

The subject location module 722 can also identify the subject prior location 232 as the location occurring before the event context time 210 and within the past time period 228. The subject location module 722 can identify the subject prior location 232 by keeping track of where the evaluation subject 213 is at different times and store such information.

The subject location module 722 can also identify the subject prior location 232 by searching the schedule calendar 502 belonging to the evaluation subject 213. The subject location module 722 can search for the calendar event 508 preceding the event context time 210 and extract the appointment location 512 as the subject prior location 232.

The subject location module 722 can also identify the subject future location 234 by identifying the destination of the evaluation subject 213 when the evaluation subject 213 is actively traversing a route. The subject location module 722 can access the routing information that the evaluation subject 213 is following to find the destination of the current travel. The subject location module 722 can identify such destination as the subject future location 234 if the evaluation subject 213 is estimated to arrive within the future time period 226.

The subject location module 722 can also identify the subject future location by searching the schedule calendar 502. The subject location module 722 can identify the appointment location 512 of the evaluation subject 213.

The subject location module 722 can search for the calendar event 508 occurring after the event context time 210 and within the future time period 226. The subject location module 722 can identify the appointment location 512 of the calendar event 508 as the subject future location 234.

The subject location module 722 can use the first control unit 612 and the location unit 620, the second control unit 634, the communication path 104, or a combination thereof to identify the location information of the evaluation subject 213. The subject location module 722 can store the two locations in the first storage unit 614, the second storage unit 646, or a combination thereof.

The purpose of the filter module 724 is to identify the event participant 214, associated with the event 204, with the event participant 214 within the geofence 212 during the event context time 210. The filter module 724 can identify the event participant 214 as the evaluation subject 213 located within the geofence 212 during the event context time 210. The filter module 724 can identify the evaluation subject 213 that was or is partaking in the event 204 and is located within the geofence 212 during the event context time 210 as the event participant 214.

The filter module 724 can acquire the current position information of the evaluation subject 213 from the subject location module 722 and compare the positioning information to the geofence 212. The evaluation subject 213 located within the geofence 212 can be identified as the event participant 214.

The filter module 724 can account for the possibility that the event participant 214 may be arriving late or briefly stepped out of the geofence 212. The filter module 724 can consider the subject prior location 232 or the subject future location 234 to account for the event participant 214 that is briefly away from the geofence 212.

The filter module 724 can compare the subject future location 234 to the geofence 212. If the subject future location 234 is within the geofence 212, the filter module 724 can identify the evaluation subject 213 as the event participant 214.

The filter module 724 can compare the subject prior location 232 identified within the past time period 228 for identifying the event participant 214. The filter module 724 can compare the subject prior location 232 to the geofence 212, and identify the event participant 214 as the event participant 214 if the subject prior location 232 is within the geofence 212.

The filter module 724 can also identify the event participant 214 scheduled to be within the geofence 212 during the event context time 210. The filter module 724 can search the schedule calendar 502 of the evaluation subject 213 for the calendar event 508 occurring during the event context time 210. If the appointment location 512 of such calendar event is within the geofence 212, the filter module 724 can identify the evaluation subject 213 as the event participant 214.

The filter module 724 can find the event participant 214 even if the event participant 214 is not within the geofence 212 during the event context time 210, but is or was scheduled to be. For example, the user can search for someone that is scheduled to attend the same trade conference that is also currently at the same airport as the user.

As an example of identifying the event participant 214, the event participant 214 can be logged into the user's address book with the event 204 associated with the event participant 214. The user can than later search for the event participant 214 according the event 204, the event location 206, the event time 208, or a combination thereof, even if the user can't recall the name of the event participant 214.

Also, as another example of identifying the event participant 214, the user can interact with the event participant 214 without exchanging private information. For example, the user may want to find and call a sales person at the trade show without exchanging phone numbers. Anonymous interaction between users is possible due to identifying the event participant 214 within the geofence 212 and the event context time 210, and not by private information.

The filter module 724 can specify the event participant 214 beyond the event 204, the geofence 212, and the event context time 210. The filter module 724 can use the search item 230 specified by the search item module 718 to further specify the event participant 214.

The filter module 724 can identify the event participant 214 as the evaluation subject 213 having the search item 230 in the participant profile 408 and was, is, or will be located in the geofence 212 during the event context time 210. The filter module 724 can narrow the search amongst the evaluation subjects that have the search item 230. The filter module 724 can identify the event participant 214 based on the geofence 212 and the event context time 210 from within the narrowed group of event participants.

The filter module 724 can also search within the participant profile 408 of the evaluation subject 213 that is, was, or is scheduled to be within the geofence 212 during the event context time 210. The filter module 724 can identify the event participant 214 as the evaluation subject 213 having the search item 230 in the participant profile 408.

The filter module 724 can also determine the user's ability as well as identifying the event participant 214. The filter module 724 can verify the device location 216 is within the geofence 212 for identifying the event participant 214.

The filter module 724 can identify the event participant 214 based on verifying the device location 216 of the user is within the geofence 212 during the event context time 210. The filter module 724 can acquire the device location 216 from the location unit 620. The location based system 100 can allow the user to identify the event participant 214 when the user is also taking part in the event 204 by being within the geofence 212 during the event context time 210.

The filter module 724 can use the first control unit 612, the second control unit 634, the first storage unit 614, the second storage unit 646, the location unit 620, or a combination thereof to identify the event participant 214. The filter module 724 can use the first control unit 612, the second control unit 634, or a combination thereof to identify the search item 230 for identifying the event participant 214.

The purpose of the interaction module 710 is to identify the user interactions with the event participant 214 and remind the user of the previous interactions with the event participant 214. For example, the interaction module 710 can help the user remember the event participant 214 by reminding the user when they last met or communicated. Details of the interaction module 710 will be described below.

Figure 8:
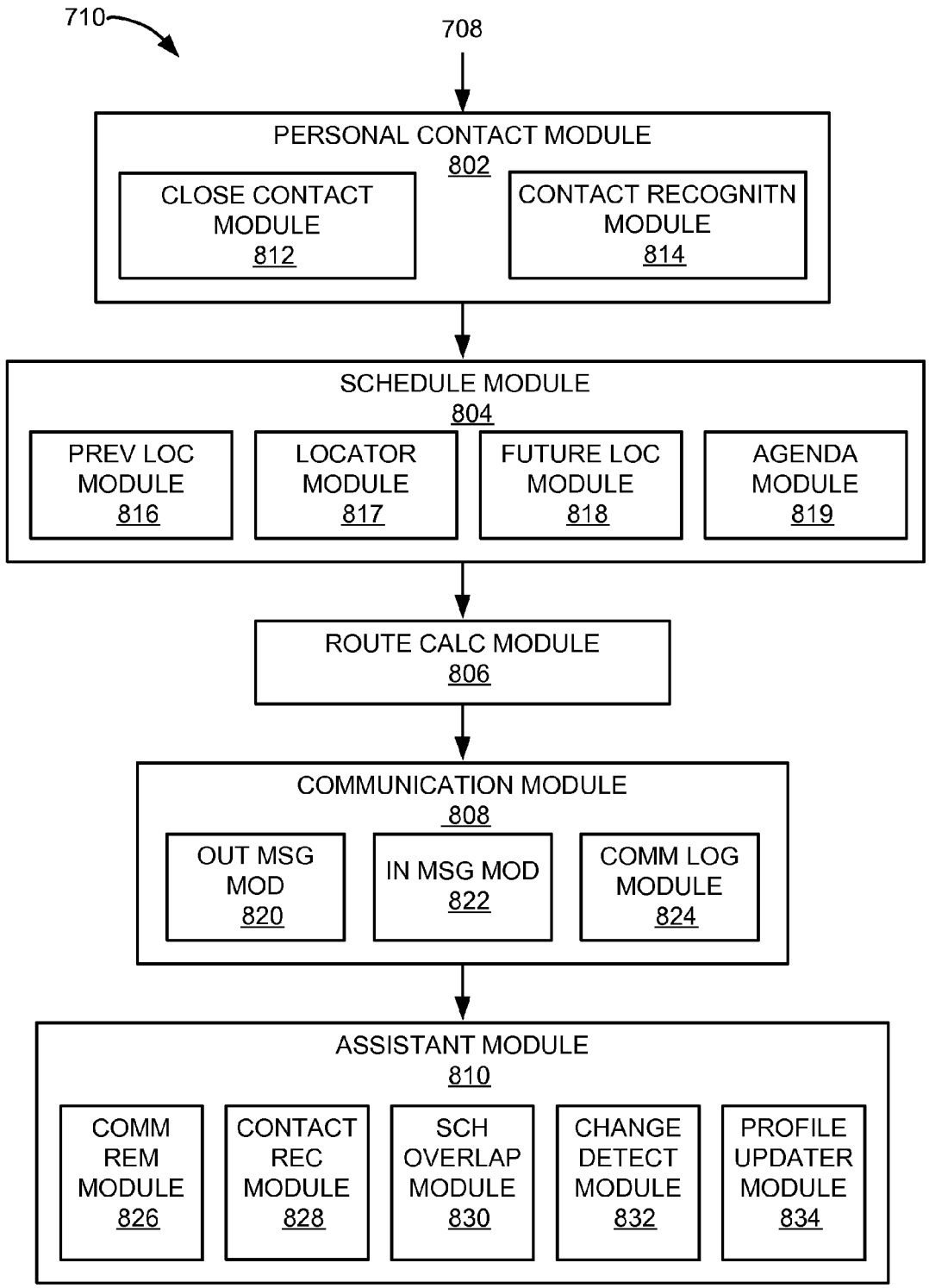
FIG. 8 is a detailed view of the interaction module.

Referring now to FIG. 8, therein is shown a detailed view of the interaction module 710. The interaction module 710 can include a personal contact module 802, a schedule module 804, a route calculation module 806, a communication module 808, and an assistant module 810.

The personal contact module 802 can be coupled to the schedule module 804, which can be also coupled to the route calculation module 806. The communication module 808 can also be coupled to the route calculation module 806 and the assistant module 810.

The purpose of the personal contact module 802 is to keep track of the event participant 214 of FIG. 2 encountered by the user of the location based system 100. The personal contact module 802 can include a close contact module 812 and a contact recognition module 814.

The purpose of the close contact module 812 is to establish the close contact boundary 224 of FIG. 2 for the event 204 of FIG. 2. The close contact module 812 can establish the close contact boundary 224 by determining an appropriate distance or boundary based on the event 204 of FIG. 2. The close contact module 812 can determine the close contact boundary 224 by matching the type of the event 204 to the distances associated with different types. The location based system 100, the user, or combination thereof can predetermine the distances associated to different types of events.

For example, the location based system 100 or the user can predetermine the close contact boundary 224 as 3 feet for conventions. The close contact module 812 can establish the close contact boundary 224 as 3 feet for the event 204 if it is a convention.

The close contact module 812 can also establish the close contact boundary 224 based on the number of participants for the event 204. For example, if the event 204 is the weekly staff meeting for a staff of ten people, the close contact boundary 224 can be established as the meeting room, the event location 206 of FIG. 2. Also, for example, if the event 204 is a yearly comic book convention with thousands of participants, the close contact boundary 224 can be established as 2 feet to distinguish the participants that the user may have contacted.

The close contact module 812 can also establish the close contact boundary 224 by querying the user and receiving user input. The close contact module 812 can establish the close contact boundary 224 based on user preference or previous selections. The close contact module 812 can also establish the close contact boundary 224 based on the event 204. For example, the close contact module 812 can recall that the user had selected five-foot radius at a previous group session and establish the close contact boundary 224 as five-foot radius for the event 204 similar in nature to the previous group session.

The close contact module 812 can use the first control unit 612 of FIG. 6, the second control unit 634 of FIG. 6, the location unit 620 of FIG. 6, or a combination thereof to establish the close contact boundary 224. The close contact module 812 can use the first storage unit 614 of FIG. 6, the second storage unit 646 of FIG. 6, or a combination thereof to store the close contact boundary 224.

The purpose of the contact recognition module 814 is to determine the contact event 218 when the event participant 214 is located within the close contact boundary 224 during the event 204. The contact recognition module 814 can detect the contact event 218 comparing the close contact boundary 224 to the location of the event participant 214 during the event time 208 and when the first device 102 is at the event location 206.

The contact recognition module 814 can detect the contact event 218 when the event participant 214 is geographically located within the close contact boundary 224. The contact recognition module 814 can be deactivated or remain idle if the user is not at the event location 206 or outside of the event time 208.

The contact recognition module 814 can be executed by or operated within the first control unit 612, the second control unit 634, the location unit 620, or a combination thereof to identify the contact event 218. The contact recognition module 814 can associate the contact event 218 to the event participant 214 using the first control unit 612, the second control unit 634, the first storage unit 614, the second storage unit 646, or a combination thereof. The contact recognition module 814 can record the contact event 218 by storing the contact event 218, the association to the event participant 214, the contact time 220, the contact location 222, or a combination thereof to the first storage unit 614, the second storage unit 646, or a combination thereof.

The purpose of the schedule module 804 is to identify where the event participant 214 was or will be. The schedule module 804 can include a previous location module 816, a locator module 817, a future location module 818, and an agenda module 819.

The purpose of the previous location module 816 is to identify the participant prior location 406 of FIG. 4 for displaying on a device. The location based system 100 can use the participant prior location 406 that involved an interaction with the event participant 214. For example, the user may not want to contact the event participant 214 regarding a sales offer if the participant prior location 406 is a funeral home.

The previous location module 816 can identify the participant prior location 406 by acquiring the subject prior location 232 of FIG. 2 from the subject location module 722 of FIG. 7. If the event participant 214 is en route, the previous location module 816 can access the route information the event participant 214 is using from the location based system 100. The previous location module 816 can identify the participant prior location 406 as the departure point of such travel.

The previous location module 816 can also identify the participant prior location 406 by searching the schedule calendar 502 of FIG. 5 belonging to the event participant 214. The previous location module 816 can start with the event context time 210 of FIG. 2 in the schedule calendar 502 and search backwards to find the calendar event 508 of FIG. 5 occurring before the event context time 210. The previous location module 816 can identify the appointment location 512 of FIG. 5 of the calendar event 508 as the participant prior location 406.

The purpose of the future location module 818 is to identify the participant future location 404 of FIG. 4. Similar to the participant prior location 406, the user can use the participant future location 404 to interact with the event participant 214.

The operations of the future location module 818 can be similar to the previous location module 816. The future location module 818 can identify the destination of the event participant 214 that is en route as the participant future location 404. The future location module 818 can also search forward in time within the schedule calendar 502 to identify the participant future location 404.

The previous location module 816 and the future location module 818 can also identify when the event participant 214 was at the participant prior location 406 or will be at the participant future location 404. The two modules can identify the appointment time period 514 of FIG. 5 associated with the relevant location. The appointment time period 514 is associated with the participant prior location 406 or the participant future location 404 if the time and location both belong to the same instance of the calendar event 508.

The purpose of the locator module 817 is to identify the participant present location 402 of the event participant 214. The locator module 817 can identify the participant present location 402 of FIG. 4 as the location information as indicated by the location unit 620 of the first device 102 belonging to the event participant 214.

The locator module 817 can also identify the participant present location 402 by searching the schedule calendar 502 belonging to the event participant 214. The locator module 817 can identify the appointment location 512 of the calendar event 508 currently occurring as the participant present location 402.

The previous location module 816, the locator module 817, and the future location module 818 can use the first control unit 612, the second control unit 634, the location unit 620, or a combination thereof to identify the participant future location 404, the participant present location 402, and the participant prior location 406. The previous location module 816, the locator module 817, and the future location module 818 can display the location information using the first control unit 612, the second control unit 634, the first display interface 630 of FIG. 6, the second display interface 640 of FIG. 6, or a combination thereof.

The purpose of the agenda module 819 is to determine the calendar event 508 for comparing with the participant future location 404. The agenda module 819 can determine the calendar event 508 that occurs within a threshold amount of time from when the event participant 214 is scheduled to be at the participant future location 404.

The agenda module 819 can search the schedule calendar 502 of the user for the same time period associated with the participant future location 404. The agenda module 819 can search for the calendar event 508 that overlaps when the event participant 214 is scheduled to be at the participant future location 404. The calendar event 508 that the agenda module 819 finds can be compared with the participant future location 404 to determine the future contact opportunity 420.

The agenda module 819 can also search the schedule calendar 502 of the user beyond when the event participant 214 is scheduled to be at the participant future location 404. For example, the agenda module 819 can search the user's schedule for one hour or two days before or after the time associated with the participant future location 404. The calendar event 508 that the agenda module 819 finds can be compared with the participant future location 404 to determine the future contact opportunity 420. The amount of buffer time used for determining the calendar event 508 can be predetermined by the user or the location based system 100.

The agenda module 819 can use the first control unit 612, the second control unit 634, the location unit 620, or a combination thereof to identify the calendar event 508. The agenda module 819 can display the calendar event 508 using the first control unit 612, the second control unit 634, the first display interface 630 of FIG. 6, the second display interface 640 of FIG. 6, or a combination thereof.

The purpose of the route calculation module 806 is to calculate the ingress travel route 416 of FIG. 4 from the participant present location 402 of FIG. 4 to the device location 216 of FIG. 2. The route calculation module 806 can assist the user by calculating a way for the event participant 214 to go from the participant present location 402 to the user, which the user can send to the event participant 214.

For example, once the user locates the event participant 214 that is a medical doctor within the convention center, the user can direct the event participant 214 to the user's location by sending the ingress travel route 416 to the event participant 214. The route calculation module 806 can pass the ingress travel route 416 to the communication module 808 for sending to the event participant 214.

The route calculation module 806 can use the first control unit 612, the second control unit 634, the location unit 620, or a combination thereof to calculate the ingress travel route 416. The route calculation module 806 can store the ingress travel route 416 on the first storage unit 614, the second storage unit 646, or a combination thereof.

The purpose of the communication module 808 is to enable communication with the event participant 214 and to log relevant information regarding all communication. The communication module can send a message to the event participant 214. The communication module 808 can include an outgoing message module 820, an incoming message module 822, and a communication logging module 824.

The purpose of the outgoing message module 820 is to send the message 302 of FIG. 3 to the event participant 214. The outgoing message module 820 can enable the user to call, send a SMS, instant message, fax, e-mail, or a combination thereof, to the event participant 214. The outgoing message module 820 can also send the ingress travel route 416, the device location 216, or both to the event participant 214.

The purpose of the incoming message module 822 is to receive the reply message 304 from the event participant 214. When the message 302 is interactive, such as in instant message or phone call, the incoming message module 822 may not be used. The outgoing message module 820 and the incoming message module 822 can use the first control unit 612, the second control unit 634, the communication path 104 of FIG. 6, the first user interface 618 of FIG. 6, the second user interface 638 of FIG. 6 or a combination thereof to communicate with the event participant 214.

The purpose of the communication logging module 824 is to log the communication profile 306 of FIG. 3 associated with the event participant 214, having the communication time 308 of FIG. 3, the communication location 310 of FIG. 3, the communication type 312 of FIG. 3, and the participant communication location 314 of FIG. 3. The communication logging module can store the details describing a communication that occurred with a user and the event participant 214. The communication logging module 824 can log the communication profile 306 by storing the communication profile 306 in the first storage unit 614, the second storage unit 646, or a combination thereof.

The purpose of the assistant module 810 is to assist the user in interacting with the event participant 214. The assistant module 810 can include a communication reminder module 826, a contact recorder module 828, a schedule overlap module 830, a change detection module 832, and a profile updater module 834.

The purpose of the communication reminder module 826 is to display the previous-communication reminder 418 of FIG. 4 based on accessing the communication profile 306 associated with the event participant 214. If the user has communicated with the event participant 214, the communication reminder module 826 can display a text, icon, picture, color, or a combination thereof as the previous-communication reminder 418 to notify the user.

The communication reminder module 826 can display the communication profile 306 for the matching communication or a link to the communication profile 306 as the previous-communication reminder 418. The communication reminder module 826 can also use a sound or a sequence of sounds as the previous-communication reminder 418.

The communication reminder module 826 can use the first control unit 612, the second control unit 634, or a combination thereof to determine if the user and the event participant 214 have corresponded. The communication reminder module 826 can display the previous-communication reminder 418 using the first control unit 612, the second control unit 634, the first display interface 630, the second display interface 640, or a combination thereof.

The purpose of the contact recorder module 828 is to record the contact event 218 of FIG. 2, having the contact time 220 of FIG. 2 and the contact location 222 of FIG. 2. The contact recorder module 828 can store the time at the instant that the contact event 218 occurs as the contact time 220. The contact recorder can store the location of the event participant 214 at the contact event 218 as the contact location 222.

The contact event 218, having the contact time 220 and the contact location 222, can be associated with the event participant 214 and stored, so that the event participant 214 and the contact event 218 will be linked or grouped together. When the user identifies the event participant 214, the contact event 218 can be used to remind the user of the encounter or interaction the user may have had with the event participant 214.

The contact recorder module 828 can use the first control unit 612, the second control unit 634, the location unit 620, or a combination thereof to identify the contact event 218. The contact recorder module 828 can associate the contact event 218 to the event participant 214 using the first control unit 612, the second control unit 634, the first storage unit 614, the second storage unit 646, or a combination thereof. The contact recorder module 828 can record the contact event 218 by storing the contact event 218, the association to the event participant 214, the contact time 220, the contact location 222, or a combination thereof to the first storage unit 614, the second storage unit 646, or a combination thereof.

The purpose of the schedule overlap module 830 is to determine the future contact opportunity 420 of FIG. 4, having the opportune location 422 of FIG. 4 and the opportune time 424 of FIG. 4, based on matching the participant future location 404 and the calendar event 508. The user can take the future contact opportunity 420 into consideration.

For example, the user can just wait to contact the event participant 214 if both the user and the event participant 214 are scheduled to attend the same conference tomorrow. Also, for example, the user can ask for a meeting around the time when the two are scheduled to be near each other.

The schedule overlap module 830 can identify the future contact opportunity 420 by comparing the user's schedule, such as the schedule calendar 502 belonging to the user, to the schedule calendar 502 belonging to the event participant 214. The schedule overlap module 830 can compare the time and location of the user's scheduled events to the appointment location 512 and the appointment location 512 in the schedule calendar 502 belonging to the event participant 214.

The schedule overlap module 830 can identify the future contact opportunity 420 as the calendar event 508 of the event participant 214 that occurs within a predetermined amount of time and within a predetermined amount of distance from the user's future scheduled events. The threshold time and distance for identifying the future contact opportunity 420 can be predetermined by the user, the location based system 100, the software manufacturer, or a combination thereof. The threshold distance can be the future contact boundary 426.

The future contact boundary 426, such as 5 miles or average 10 minute driving distance, can be used to identify the future contact opportunity 420. For example, the schedule overlap module 830 can identify the calendar event 508 of the event participant 214 that will be occurring within 5 miles from the user's future scheduled event if the future contact boundary 426 is set to 10 miles.

The schedule overlap module 830 can also set the future contact boundary 426 to a proportion, such as 10% or one quarter, of the distance between two adjacent calendar events in the schedule calendar 502 of the user. For example, if the user has to travel 100 miles from calendar event X to the next occurring calendar event Y, the schedule overlap module 830 can set 10% or 10 miles for as the future contact boundary 426.

The schedule overlap module 830 can similarly use adjacent calendar events to determine the predetermined time for identifying the future contact opportunity 420. For example, if the user has 2 hours between calendar event X and the next occurring calendar event Y, the schedule overlap module 830 can use one quarter or 30 minutes for identifying the future contact opportunity 420.

The schedule overlap module 830 can combine the time and distance considerations to identify the future contact opportunity 420. For example, if the user is scheduled for a lunch appoint within 5 miles and ending 15 minutes before the hairdresser appointment of the event participant 214, the hairdresser appointment can be identified as the future contact opportunity 420. Also, for example, if the user and the event participant 214 are both scheduled to attend the same event occurring at a future time, the event 204 that is common can be the future contact opportunity 420.

The schedule overlap module 830 can use the first control unit 612, the second control unit 634, the first storage unit 614, the second storage unit 646, the location unit 620, or a combination thereof to identify the future contact opportunity 420. The contact recorder module 828 can display the future contact opportunity 420 using the first control unit 612, the second control unit 634, the first display interface 630, the second display interface 640, or a combination thereof.

The purpose of the change detection module 832 is to detect a change to the participant profile 408 belonging to the event participant 214. The change detection module 832 can compare the participant profile 408 accessed by the profile module 720 of FIG. 7 to the one accessed previously. The change is detected when the two are not the same. For example, if the event participant 214 was promoted to a new position, the change detection module 832 can access the participant profile 408 that has been updated and detect the change in the job titles.

The change detection module 832 can also detect a change to the participant profile 408 by determining if the event participant 214 made changes the participant profile 408. For example, if the participant profile 408 is from a personal website belonging to the event participant 214, the change detection module 832 can determine that the event participant 214 made changes when the event participant 214 saves the contents of the website.

The change detection module 832 can use the first control unit 612, the second control unit 634, the first storage unit 614, the second storage unit 646, or a combination thereof to compare the participant profile 408 accessed at different times. The change detection module 832 can use the first control unit 612, the second control unit 634, the first storage unit 614, and the second storage unit 646, to determine if the event participant 214 made any changes.

The purpose of the profile updater module 834 is to update the participant profile 408 with the change detected by the change detection module 832. The profile updater module 834 can update the participant profile 408 by storing the participant profile 408 in the location based system 100. The profile updater module 834 can store the participant profile 408 using the first control unit 612, the second control unit 634, the first storage unit 614, the second storage unit 646, or a combination thereof.

The profile updater module 834 can also update the participant profile 408 by displaying the profile change notice 414 of FIG. 4 and notifying the user of the change. The profile updater module 834 can display the profile change notice 414 by using the first control unit 612, the second control unit 634, the first display interface 630 of FIG. 6, the second user interface 638 of FIG. 6, or a combination thereof.

For illustrative purposes the location based system 100 is described as identifying the evaluation subject 213 first then identifying the event participant 214. However, it is understood that the location based system 100 can operated differently and that each of the modules can operate individually and independently of the other modules.

For example, the filter module 724 of FIG. 7 can identify each person or entity within the geofence 212, if the event context time 210 includes or is equivalent to the current time. The filter module 724 can then compare them with a listing of the people, entity, or things associated with the event, such as the registration list or the event schedule.

The event 204 may have no known list of people, entity, or things associated with the event, such as in the case of visitors to a show and drop-in customers. In such example, the filter module 724 can identify each person or entity within the geofence 212 during the event context time 210 as the event participant 214.

Also, for example, the subject location module 722 can identify the participant present location 402 instead of the locator module 817. The subject location module 722 can also identify the event participant 214 by comparing the locations to the geofence 212 instead of the filter module 724.

The location based system 100 can be partitioned between the first device 102 of FIG. 7 and the second device 106 of FIG. 7. For example, the location based system 100 can be partition into the functional units of the first device 102, the second device 106, or a combination thereof. The subject location module 722 and the locator module 817 can be on the first device 102 and the filter module 724 can be on the second device 106.

The location based system 100 can also be implemented as additional functional units in the first device 102, the second device 106, or a combination thereof. For example, the interaction module 710 can be additional functional unit in the first device 102 and the search module 708 of FIG. 7 can be additional functional unit in the second device 106.

The physical transformation of the event 204, such as a change in meeting time or location, results in movement in the physical world, such as in identifying or locating the event participant 214, based on the operation of the location based system 100. The movement of people in the real world can be fed back to the location based system 100 to further operate the location based system 100 to locate relevant acquaintances. For example, if the event location 206 or the event time 208 changes, the people or entities attending the event 204 can change, and thus change the identity or location of the event participant 214.

It has been discovered that the present invention provided the location based system 100 that provide improved efficiency and convenience for managing contacts or acquaintances. The identification of the event participant 214 gives rise to the benefits by identifying only the contacts or acquaintances that are associated with the event 204 or the context of the event 204. The identification of the event participant 214 can allow the user to quickly and conveniently find the contact the user seeks.

Thus, it has been discovered that the location based system with contextual contact manager of the present invention furnishes important and heretofore unknown and unavailable solutions, capabilities, and functional aspects for locating relevant contacts.

Figure 9:
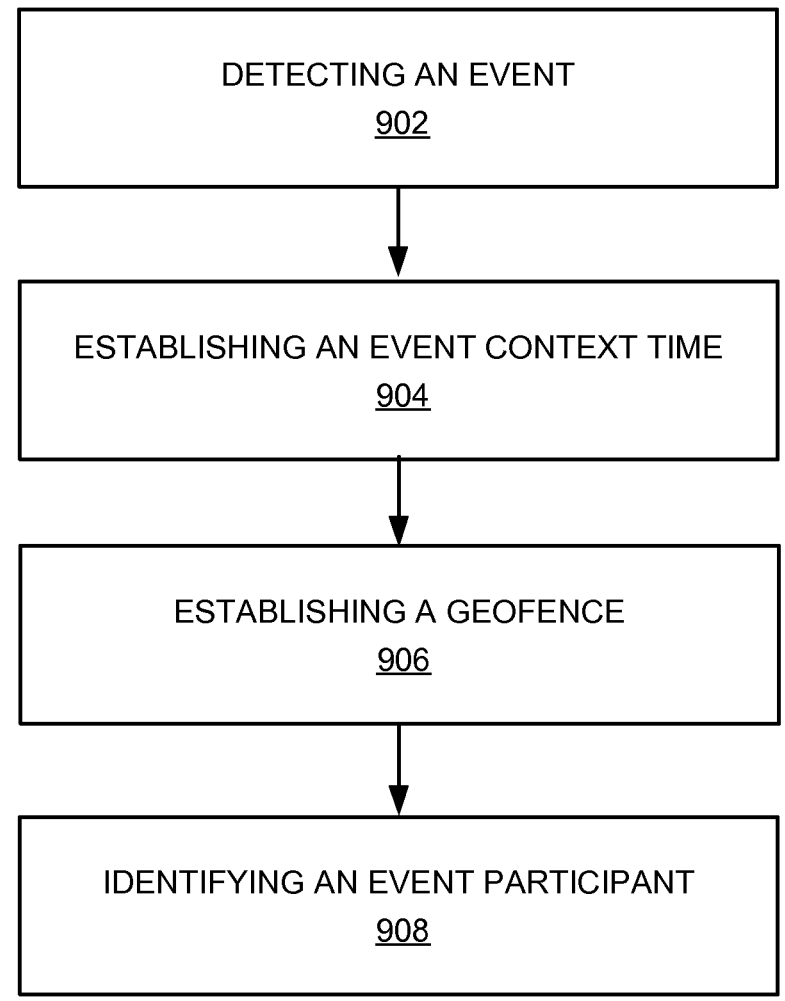
FIG. 9 is a flow chart of a method of operation of the location based system in a further embodiment of the present invention.

Referring now to FIG. 9, therein is shown a flow chart of a method 900 of operation of the location based system 100 in a further embodiment of the present invention. The method 900 includes: detecting an event in a block 902; establishing an event context time associated with the event in a block 904; establishing a geofence associated with the event in a block 906; and identifying an event participant, associated with the event, with the event participant within the geofence during the event context time for displaying on a device in a block 908.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a location based system comprising:
    detecting an event occurring at an event location, wherein the event represents a gathering at an event time;
    establishing an event context time associated with the event;
    establishing a geofence based on the event location of the event; and
    identifying an event participant, with a control unit, associated with the event and within the geofence during the event context time for displaying on a device.

2. The method as claimed in claim 1 wherein identifying the event participant includes identifying the event participant scheduled to be within the geofence during the event context time.

3. The method as claimed in claim 1 further comprising:
    identifying a device location at the time of identifying the event participant for locating a user identifying the event participant; and
wherein:
    identifying the event participant includes verifying the device location is within the geofence.

4. The method as claimed in claim 1 further comprising:
    establishing a close contact boundary for the event; and
    determining a contact event when the event participant is located within the close contact boundary during the event.

5. The method as claimed in claim 1 further comprising:
    sending a message to the event participant;
    logging a communication profile, having, having a communication time, a communication location, a communication type, and a participant communication location with the communication profile associated with the event participant; and
    displaying a previous-communication reminder based on accessing the communication profile associated with the event participant.

6. A method of operation of a location based system comprising:
    detecting an event occurring at an event location, wherein the event represents a gathering at an event time;
    establishing an event context time associated with the event;
    establishing a geofence based on the event location of the event;
    identifying an event participant, with a control unit, associated with the event and within or scheduled to be within the geofence during the event context time for displaying on a device;

identifying a device location at the time of identifying the event participant for locating a user identifying the event participant; and verifying the device location is within the geofence.

7. The method as claimed in claim 6 further comprising:

identifying a participant future location, where the event participant is scheduled to be at a time occurring in the future;

determining a calendar event for comparing with the participant future location; and determining a future contact opportunity, having an opportune location and an opportue time, based on matching the participant future location and the calendar event.

8. The method as claimed in claim 6 further comprising:

identifying a participant present location of the event participant;

informing the event participant of the device location;

calculating an ingress travel route from the participant present location to the device location; and sending the ingress travel route to the event participant.

9. The method as claimed in claim 6 further comprising:

setting a past time period for identifying the event participant within the geofence within the past time period of the event context time;

identifying a subject prior location at the past time period; and wherein:

identifying the event participant includes comparing the subject prior location identified within the time not exceeding the past time period to the geofence.

10. The method as claimed in claim 6 further comprising:

setting a future time period for identifying the event participant to arrive in the geofence within the future time period of the event context time;

identifying a subject future location at the future time period; and wherein:

identifying the event participant includes comparing the subject future location identified within the time not exceeding the future time period to the geofence.

11. A location based system comprising:

a storage interface configured to access an event occurring at an event location;

a control unit, coupled to the storage interface, configured to:

establish an event context time associated with the event;

establish a geofence based on the event location of the event; and identify an event participant, associated with the event and within the geofence during the event context time for displaying on a device.

12. The system as claimed in claim 11 wherein the control unit is configured to identify the event participant scheduled to be within the geofence during the event context time.

13. The system as claimed in claim 11 further comprising:

a location unit, coupled to the control unit, configured to identify a device location at the time of identifying the event participant for locating a user identifying the event participant; and wherein:

the control unit is configured to verify the device location is within the geofence.

14. The system as claimed in claim 11 wherein the control unit is configured to:

establish a close contact boundary for the event; and determine a contact event when the event participant is located within the close contact boundary during the event.

15. The system as claimed in claim 11 further comprising:

a communication unit, coupled to the control unit, configured to send a message to the event participant;

a storage unit, coupled to the control unit, configured to log a communication profile, having a communication time, a communication location, a communication type, and a participant communication location with the communication profile associated with the event participant; and a user interface, coupled to the control unit, configured to display a previous-communication reminder, based on accessing the communication profile associated with the event participant.

16. The system as claimed in claim 11 further comprising:

a location unit, coupled to the control unit, configured to identify a device location at the time of identifying the event participant for locating a user identifying the event participant; and wherein:

the control unit is configured to verify the device location is within or scheduled to be the geofence.

17. The system as claimed in claim 16 wherein the control unit is configured to:

identify a participant future location, where the event participant is scheduled to be at a time occurring in the future;

determine a calendar event for comparing with the participant future location; and determine a future contact opportunity, having an opportune location and an opportue time, based on matching the participant future location and a calendar event.

18. The system as claimed in claim 16 wherein:

the control unit is configured to:

identify a participant present location of the event participant;

calculate an ingress travel route from the participant present location to the device location;

further comprising a communication unit, coupled to the control unit, configured to:

send the ingress travel route to the event participant; and inform the event participant of the device location.

19. The system as claimed in claim 16 wherein the control unit is configured to:

set a past time period for identifying the event participant within the geofence within the past time period of the event context time;

identify a subject prior location at the past time period; and compare the subject prior location identified within the time not exceeding the past time period.

20. The system as claimed in claim 16 wherein the control unit is configured to:

set a future time period for identifying the event participant to arrive in the geofence within the future time period of the event context time;

identify a subject future location at the future time period; and compare the subject future location identified within the time not exceeding the future time period.

* * * * *